US012558839B2

(12) United States Patent
    Liang et al.

(10) Patent No.: US 12,558,839 B2
(45) Date of Patent: Feb. 24, 2026

(54) THREE-DIMENSIONAL PRINTING OF GLASS MICRO-OPTICS

(71) Applicant: ARIZONA BOARD OF REGENTS ON BEHALF OF THE UNIVERSITY OF ARIZONA, Tucson, AZ (US)

(72) Inventors: Rongguang Liang, Tucson, AZ (US); Douglas A. Loy, Tucson, AZ (US); Zhihan Hong, Tucson, AZ (US); Piaoran Ye, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 117 days.

(21) Appl. No.: 18/557,256

(22) PCT Filed: Apr. 27, 2022

(86) PCT No.: PCT/US2022/026580

§ 371 (c)(1),
(2) Date: Oct. 25, 2023

(87) PCT Pub. No.: WO2022/232303

PCT Pub. Date: Nov. 3, 2022

(65) Prior Publication Data

US 2024/0300170 A1     Sep. 12, 2024

Related U.S. Application Data

(60) Provisional application No. 63/180,585, filed on Apr. 27, 2021.

(51) Int. Cl.
    *B33Y 70/00*     (2020.01)
    *B29C 64/112*     (2017.01)
    (Continued)

(52) U.S. Cl.
    CPC .......... *B29C 64/188* (2017.08); *B29C 64/112* (2017.08); *B29D 11/00365* (2013.01);
    (Continued)

(58) Field of Classification Search
    None
    See application file for complete search history.

(56)     References Cited

U.S. PATENT DOCUMENTS

| | | | |
|---|---|---|---|
| 2012/0059080 A1* | 3/2012 | Fukushima | C09D 183/06 |
| | | | 522/66 |
| 2018/0251645 A1* | 9/2018 | Magdassi | C09D 11/101 |

OTHER PUBLICATIONS

Zhihan Hong, Piaoran Ye, Douglas A. Loy, and Rongguang Liang, "Three-dimensional printing of glass micro-optics," Optica 8, 904-910 (2021).

* cited by examiner

*Primary Examiner* — Mohammad M Ameen
(74) *Attorney, Agent, or Firm* — NGUYEN TARBET IP LAW

(57)     ABSTRACT

The present invention features a liquid, solvent-free, silica precursor and two-photon 3D printing process to meet the increasing needs of high-precision glass micro-optics and address the major limitations of current three-dimensional (3D) printing optics. The printed optical elements may be fully converted to transparent inorganic glass at temperatures as low as 600° C. with shrinkages as low as 17%. The present invention includes a complete process chain, from material development, printing process, and performance evaluation of the printed glass micro-optics. 3D printing of glass micro-optics with isotropic shrinkage, micrometer resolution, low deviation peak-to-valley value (<100 nm), and low surface roughness (<6 nm) has been demonstrated. The present invention enables the rapid fabrication of com-
(Continued)

plex glass micro-optics previously impossible using conventional glass optics fabrication processes.

7 Claims, 22 Drawing Sheets

(51) Int. Cl.

| | |
|---|---|
| *B29C 64/188* | (2017.01) |
| *B29D 11/00* | (2006.01) |
| *B33Y 10/00* | (2015.01) |
| *B33Y 40/20* | (2020.01) |
| *B33Y 80/00* | (2015.01) |
| *C03B 19/01* | (2006.01) |
| *C03B 19/06* | (2006.01) |
| *B29K 105/00* | (2006.01) |
| *B29K 105/16* | (2006.01) |
| *B29K 509/08* | (2006.01) |

(52) U.S. Cl.

CPC ............... *B33Y 10/00* (2014.12); *B33Y 40/20* (2020.01); *B33Y 70/00* (2014.12); *B33Y 80/00* (2014.12); *C03B 19/01* (2013.01); *C03B 19/066* (2013.01); *B29K 2105/0002* (2013.01); *B29K 2105/16* (2013.01); *B29K 2509/08* (2013.01); *B29K 2995/0026* (2013.01); *B29K 2995/0073* (2013.01)

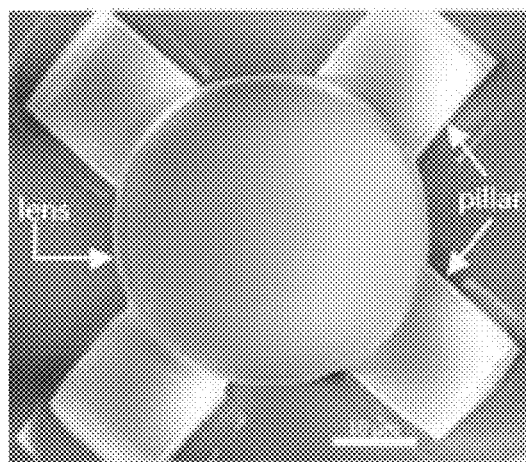
FIG. 8A
FIG. 8B
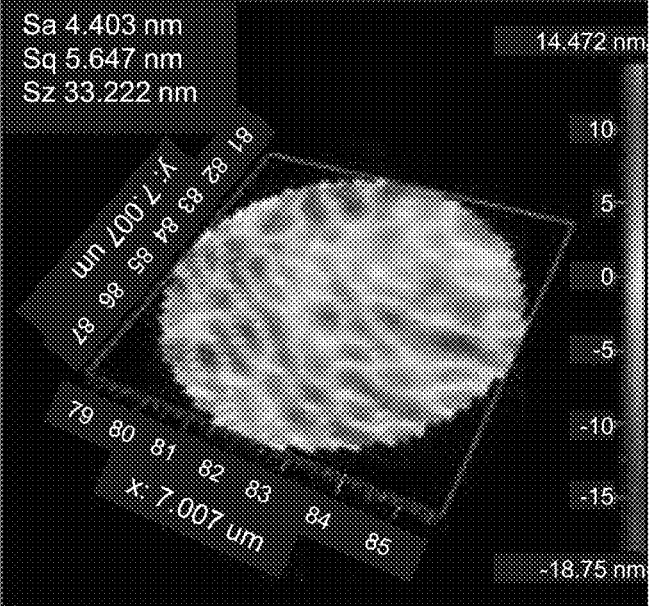
FIG. 8C
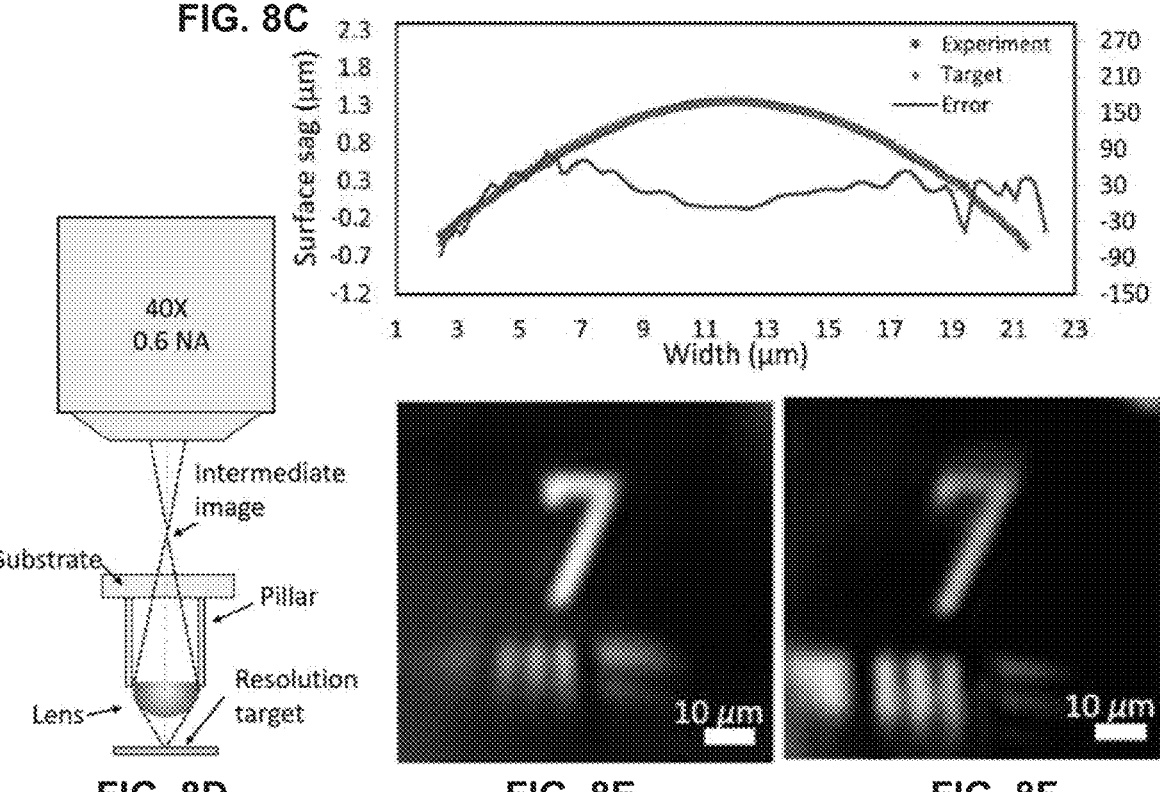
FIG. 8D
FIG. 8E
FIG. 8F

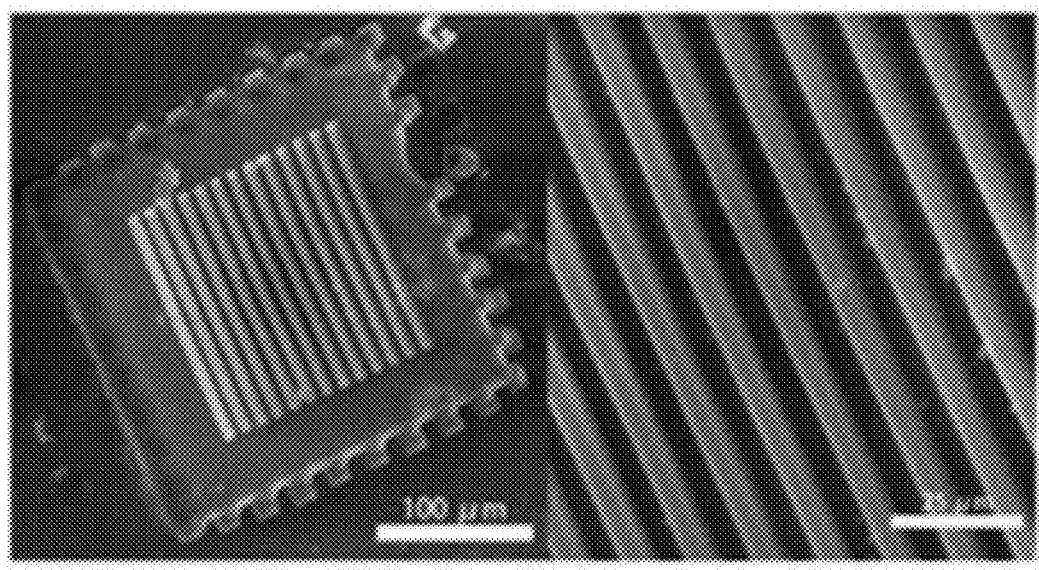
FIG. 9A
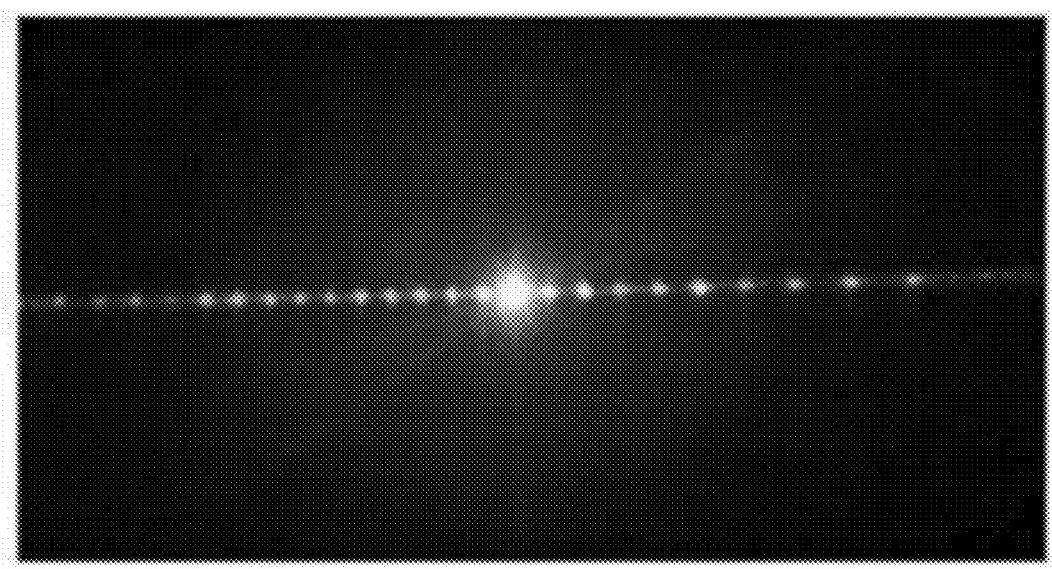
FIG. 9B
| TMOS (g) | MPTS (g) | MMTS (g) | MeOH (g) | 1 M HCl (g) |
|---|---|---|---|---|
| 3.2 | 0.712 (12 mol%) | N/A | 8.822 | 0.624 |
| 3.2 | 0.361 (6.5 mol%) | N/A | 8.300 | 0.586 |
| 3.2 | N/A | 0.320 (6.5 mol%) | 8.300 | 0.586 |
| 3.2 | N/A | 0.143 (3 mol%) | 8.000 | 0.566 |
FIG. 10

Methacryloxymethyltrimethoxysilane 3-methacryloxypropyltrimethoxysilane

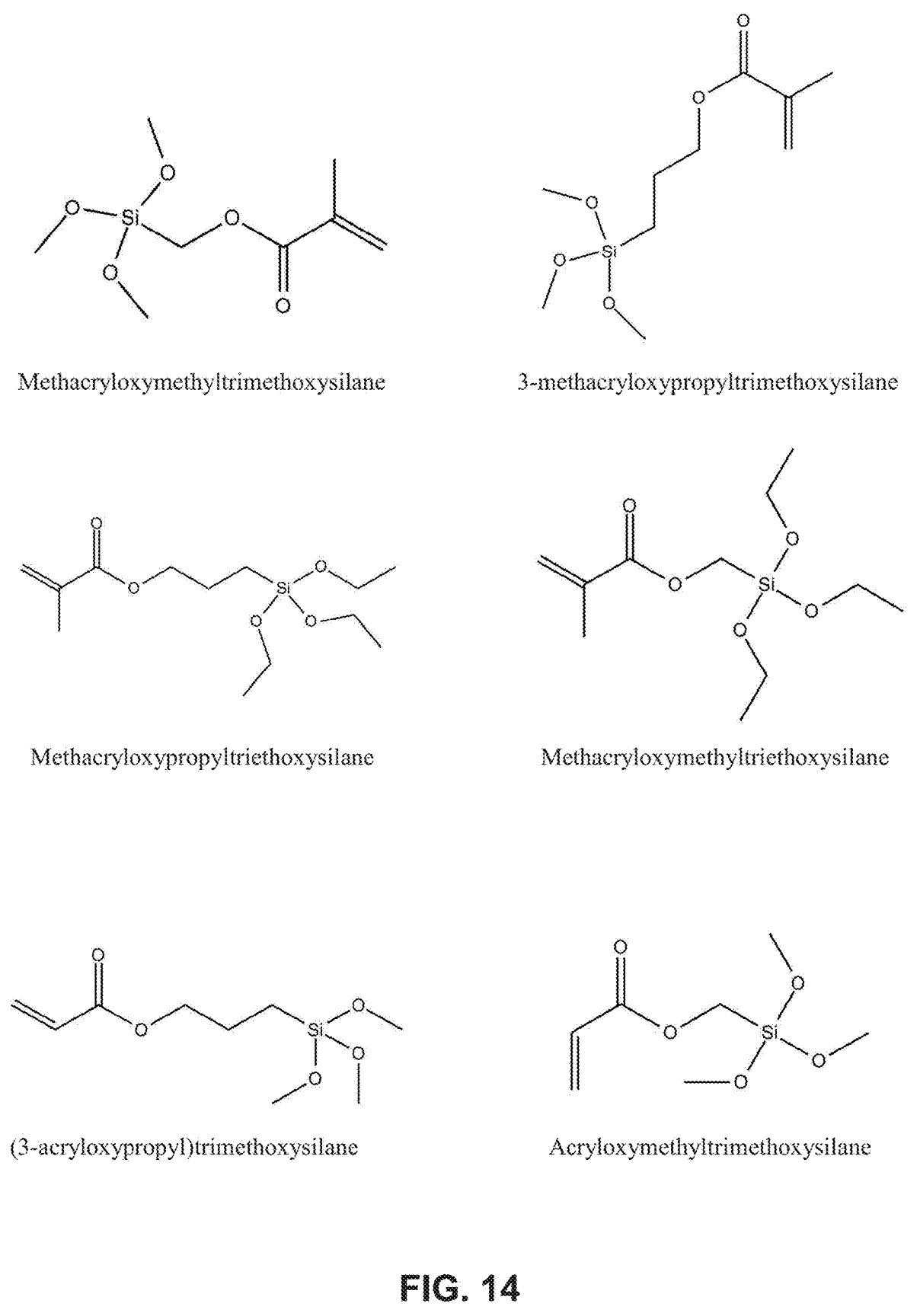

Methacryloxypropyltriethoxysilane

Methacryloxymethyltriethoxysilane (3-acryloxypropyl)trimethoxysilane

Acryloxymethyltrimethoxysilane

FIG. 14

Sample broken during condensation

Sample was cured by UV in a pan before testing

FIG. 29D                    FIG. 29E

Printed dispersion group

NA 0.15 Objective

Dispersed spectrum

CMOS camera

THREE-DIMENSIONAL PRINTING OF GLASS MICRO-OPTICS

CROSS-REFERENCES TO RELATED APPLICATIONS

This application claims benefit of U.S. Provisional Application No. 63/180,585 filed Apr. 27, 2021 the specification of which is incorporated herein in its entirety by reference.

STATEMENT REGARDING FEDERALLY SPONSORED RESEARCH OR DEVELOPMENT

This invention was made with government support under Grant Nos. CA268190, OD018061, and DE030682 awarded by National Institutes of Health and Grant No. 1918260 awarded by the National Science Foundation. The government has certain rights in the invention.

BACKGROUND OF THE INVENTION

Field of the Invention

The present invention relates to materials for three-dimensional printing of glass microstructures. More specifically, the present invention relates to photocurable liquid silica resins for three-dimensional printing of glass micro-optics.

Background Art

Due to the excellent optical, chemical, and thermal properties, inorganic glasses are widely used in industry, defense, space, and high-end consumer applications. Conventional grinding and polishing methods are the standards for fabricating spherical, aspherical, and flat surfaces, but are slow and incapable of affording freeform surfaces. In addition, traditional grinding and polishing are not suitable for fabricating glass micro optics. Precision press molding is an efficient method for fabricating freeform optical elements, but, due to the time and cost of preparing high-precision molds, is not suitable for rapid prototyping. Optical elements with microstructures, such as diffractive optical elements and gratings, are commonly formed with microlithography, etching, and molding. Although modern fabrication processes have achieved a high level of efficiency and reproducibility, novel strategies are still needed for making complex-shaped, especially micro-sized, glass optics.

Three-dimensional (3D) printing is attractive due to its flexibility in building complex shapes through an additive process. While there have been tremendous advances in additive manufacturing (AM), 3D printing of optics has lagged because of the stringent requirements on surface shape, surface roughness, and homogeneity in optical properties, as well as a limited selection of printable optical materials. Presently, most work in printing optics centers on organic polymer-based components that are limited in practical applications due to their poor thermal stability, low transmission in short wavelengths, and low refractive indices. Direct printing of transparent inorganic glass optics with laser sintering, fused filament deposition, direct ink writing (DIW), stereolithography (STL), projection microstereolithography (PμSL), or two-photon stereolithography (TPSL) has generally not achieved the quality required for optical applications. These approaches have been limited by shrinkage related to burning out of organic components and high temperature sintering, defects (bubbles, hidden layers, etc.), and a limited range of materials. Fused glass filament deposition of inorganic glass fiber avoids much of the shrinkage but suffers from low print resolution due to the diameter of the filament. DIW exhibits superior resolution, but suffers from shrinkage as the ink solvent evaporates and the suspended silica particles are sintered. STL, PμSL and TPSL approaches using inorganic particles suspended in curable liquid organic resins are impeded by unacceptably high viscosities with higher particle loadings and shrinkage due to the burn out of organics and melting of the remaining particles into a glass. Some improvement is observed when the organic resin is replaced by an organosilicon analog that converts into silica during the sintering process. Considering that shrinkage is a central deterrent to successful 3D printing of inorganic glass optics, replacing the organic solvent with a low viscosity, liquid, inorganic resin would serve to permit high resolution STL, PμSL and TPSL printing with minimal shrinkage.

BRIEF SUMMARY OF THE INVENTION

It is an objective of the present invention to provide systems, compositions, and methods that allow for three-dimensional printing of glass micro-optics with minimal shrinkage, as specified in the independent claims. Embodiments of the invention are given in the dependent claims. Embodiments of the present invention can be freely combined with each other if they are not mutually exclusive.

In one embodiment, the present invention features 3D printing of glass micro-optics with minimal shrinkage with two-photon polymerization (TPP) (FIG. 1A) using a photosensitive, liquid silica resin (LSR) based on pre-condensed silica used to prepare low density silica aerogels (FIG. 1B). TPP is able to achieve a small volume curing, and has been investigated extensively for high resolution printing of optical elements based on liquid organic resins. One example LSR is an oligomer derived from the acid-catalyzed hydrolysis and condensation of tetramethoxysilane and a small amount of methacryloxy-modified trimethoxysilane with a substoichiometric amount of water. Pyrolysis at 600° C. followed by sintering at 1000° C. eliminates any residual organics and converts the cured resin to silica. Compared to shrinkage from previous reports, which is usually from 30% to more than 60%, the LSR shows only 17% shrinkage with pyrolysis and only an additional 4% shrinkage with sintering. Printing is carried out by direct writing in a single droplet of LSR on a quartz slide with femtosec pulse 780 nm laser. The printing was achieved by layer overlapping at an equal arc-length of 500 nm. The number of layers is around 50 to 100 based on the thickness of the printed structure. The glass micro-lens and gratings may be printed in high resolution. The surface of final glass optics can be precisely controlled with a peak-to-valley of <100 nm and the surface roughness lower than 6 nm.

One of the unique and inventive technical features of the present invention is the condensation reaction between a tetraalkoxysilane monomer and a photocurable silane monomer. Without wishing to limit the invention to any theory or mechanism, it is believed that the technical feature of the present invention advantageously provides for a photopolymerizable high-silica-content resin that is liquid and does not require a solvent for three dimensional printing applications. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The features and advantages of the present invention will become apparent from a consideration of the following detailed description presented in connection with the accompanying drawings in which:

FIG. 1A shows a schematic of the 3D printing system. M1 and M2 are the folding mirrors; $L_1$ and $L_2$ are the lenses for the beam expander; $Obj_1$ and $Obj_2$ are the microscope objectives for curing the material and monitoring the printing process, respectively; and BS is the beam splitter. FIG. 1B shows synthesis of LSR's. Every micro-optic was printed in a single droplet of material. FIG. 1C shows the fabrication process of the glass micro-optics. FIG. 1D shows a 3D printed glass micro-lens on a supporting structure.

FIG. 5A shows FTIR-ATR spectra of the printed sample before and after thermal treatment. FIG. 5B shows shrinkage after heat treatment from 200° C. to 1000° C. FIG. 5C shows the silica glass ring as-printed. FIG. 5D shows the silica glass ring after being post-treated at 600° C. FIG. 5E shows the silica glass ring after being post treated at 1000° C.

FIG. 6A shows an SEM image of 3D printed squares (scale bar=25 μm). FIG. 6B shows the surface profile of the array of single layer squares printed with different laser pulse energies and exposure times. FIG. 6C shows the distribution of the heights of printed single layer squares.

FIG. 7A shows a microscopic image of the printed grating array after sintering at 1000° C. FIG. 7B shows the grating profiles and SEM images of the four gratings in FIG. 7A.

FIGS. 8A-8F illustrate a printed glass micro-lens of the present invention. FIG. 8A shows the micro-lens printed on supporting pillars (600° C. treated). FIG. 8B shows the measured surface of the fabricated lens. FIG. 8C shows the surface profile of the printed lens and the deviation from the design. FIG. 8D shows a diagram of experimental setup for evaluating the imaging performance. FIG. 8E shows an image of the first element in Group 7 in 1951 USAF resolution target for the lens after thermal treatment at 600° C. FIG. 8F shows an image of the first element in Group 7 in 1951 USAF resolution target for the lens after thermal treatment at 1000° C.

FIGS. 9A-9B illustrate a printed rectangular grating of the present invention. FIG. 9A shows SEM images of a glass grating after thermal treatment at 600° C. FIG. 9B shows the resulting diffraction pattern for a 632.8 nm laser beam.

FIG. 10 shows the formulas of different precursors used for printing in this study. For these examples, the molar ratio between MeOH and silane was kept as 11.5 to 1, and the molar ratio between 1 M HCl to silane was kept as 1.45 to 1.

FIG. 11B shows the dots after being heated at 600° C. There was around 17% linear shrinkage after thermal treatment.

FIG. 12A shows detachment of the printed part from the substrate. FIG. 12B shows the broken element. FIG. 12C shows a micro-lens with deformed edge.

FIG. 14 shows non-limiting examples of photocurable silane monomers.

FIG. 25A shows an SEM image and FIG. 25B shows the surface roughness of a printed flat element. FIG. 25C shows the measured surface shape of a printed spherical surface with a radius of 370 μm and FIG. 25D shows the deviation of the printed surface profile from the designed shape. The measurement was performed with Zygo Newview 8300 optical profilometer.

FIG. 27A shows ray tracing of the plano-convex singlet with spherical surface (top) and aspherical surface (bottom). FIG. 27B shows an SEM image of the plano-convex single with a spherical surface. FIG. 27C shows an image of the element of the 4th group in the USAF resolution target captured by the lens in FIG. 27B. FIG. 27D shows an SEM image of the plano-convex single with aspherical surface. FIG. 27E shows surface deviation of the printed and designed aspherical surface, and FIG. 27F shows an image of the element of the 4th group in the USAF resolution target captured by the lens in FIG. 27D.

FIG. 28A shows an SEM image of a Fresnel surface. FIG. 28B shows the image of a 1951 USAF resolution target. FIG. 28C shows an SEM image of a grating with a period of 1.1 μm.

FIGS. 29A-29I illustrate a 3D printed micro-objective with three elements. FIG. 29A shows an SEM image of the printed micro-objective. FIG. 29B shows the optical layout.

FIG. 29C shows the setup for evaluating the imaging performance of the printed micro-objective. FIG. 29D shows the image of a 1951 USAF resolution target. FIG. 29E shows an image of a house fly wing captured by the printed micro-objective. FIG. 29F shows the optical layout of an endoscope objective with three elements. FIG. 29G shows an SEM image of the printed micro-objective. FIG. 29H shows an image of a 1951 USAF resolution target, and FIG. 29I shows an image of a house fly wing captured by the printed endoscope objective.

FIG. 30A shows the optical layout of the assembly. FIG. 30B shows an SEM image of the printed dispersion assembly. FIG. 30C shows an SEM image of the lens surface with grating, and FIG. 30D shows a dispersed spectrum captured by the CMOS camera.

FIG. 31A shows a schematic diagram and FIG. 31B shows an SEM image of the assembled Alvarez lens.

FIG. 31C shows the experimental setup, FIG. 31D shows measured spot sizes, and FIG. 31E shows simulated spot sizes.

DETAILED DESCRIPTION OF THE INVENTION

Figures 1A, 1B, 1C, 1D:
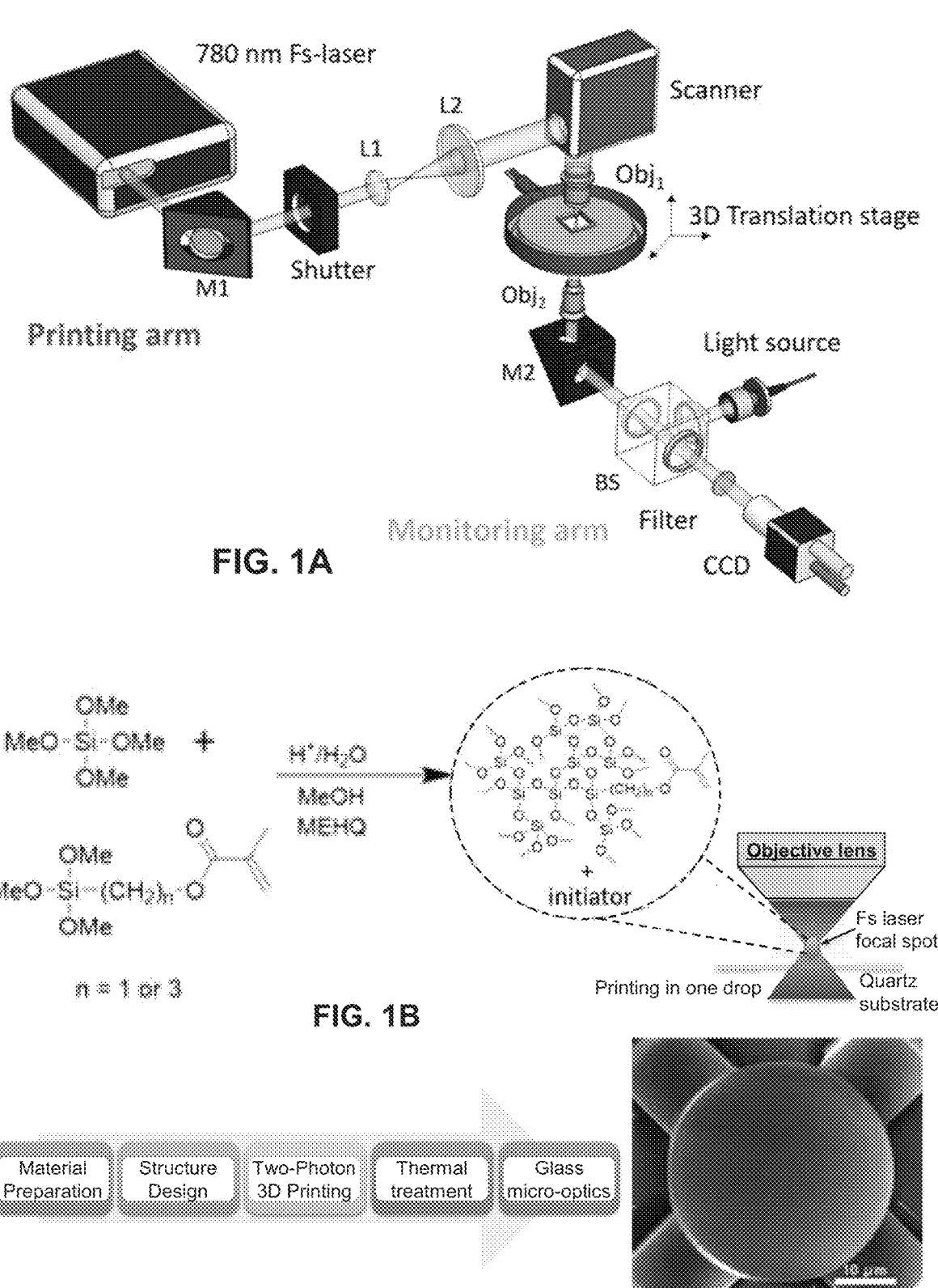
FIGS. 1A-1D illustrate the printing system and printing process.

In one embodiment, the present invention features a liquid silica resin for three dimensional printing of low shrinkage glass microstructures, where the resin is a high-silica-content polymer having a covalently linked photopolymerizable moiety. As a non-limiting example, the liquid silica resin may be the product of a condensation reaction between a tetraalkoxysilane monomer and a photocurable silane monomer. As used herein, the term "the photocurable silane monomer" refers to a monomer having a moiety which may be polymerized in a photo-induced polymerization. As non-limiting examples, this photopolymerizable moiety may be an acrylic or methacrylic moiety. In some embodiments, the photocurable silane monomer may be a trialkoxysilane monomer. As non-limiting examples, the photocurable silane monomer may be methacryloxymethyltrimethoxysilane, 3-methacryloxypropyltrimethoxysilane, methacryloxypropyltriethoxysilane, methacryloxymethyltriethoxysilane, (3-acryloxypropyl)trimethoxysilane, or acryloxymethyltrimethoxysilane. As additional non-limiting examples, the tetraalkoxysilane monomer may be tetraethoxysilane (TEOS), tetramethoxysilane (TMOS), tetraisopropoxysilane, or tetrabutoxysilane.

According to some embodiments, the condensation reaction between the tetraalkoxysilane monomer and the photocurable silane monomer may be a partial condensation reaction. As a non-limiting example, the degree of the partial condensation reaction may be determined by the use of a substoichiometric amount of water in the condensation reaction. In some preferred embodiments, the degree of the partial condensation reaction may be selected such that the resin is liquid at room temperature.

The present invention may feature a silica resin for three dimensional printing of low shrinkage glass microstructures, where the resin features a high-silica-content oligomer having a covalently linked photopolymerizable moiety, where the resin is liquid. In some embodiments, the resin may be configured to be cured via exposure to UV light. In preferred embodiments the cured resin is configured to form a sintered glass via thermal treatment. In some embodiments, the composition of the resin is such that thermal treatment of the cured resin causes less than 30%, 25%, 20%, 15%, or 10% shrinkage. In selected embodiments, the resin is more than 70, 72, 74, 76, 78, 80, 82, 84, 86, 88, 90, 92, 94, 96, or 98 weight percent Si and O. In preferred embodiments, the resin has a viscosity suitable for three dimensional printing.

In some embodiments, the present invention features a method of producing a liquid silica resin for three dimensional printing of low shrinkage glass microstructures. As a non-limiting example, the method may include: providing a reaction vessel; introducing a tetraalkoxysilane monomer to the reaction vessel; introducing a photocurable silane monomer to the reaction vessel; introducing an aqueous catalyst to the reaction vessel; and heating the reaction vessel to a condensation temperature. In preferred embodiments, these steps cause a condensation reaction between the tetraalkoxysilane monomer and the photocurable silane monomer, so as to produce the liquid silica resin. In some embodiments, the aqueous catalyst may be an acidic or basic catalyst. As a non-limiting example, the aqueous catalyst may be dilute HCl. The amount of the aqueous catalyst may be selected such that a viscosity of the liquid silica resin is suitable for three dimensional printing without a solvent. In some preferred embodiments, the amount of the aqueous catalyst may be selected such that a viscosity of the liquid silica resin is suitable for three dimensional printing at room temperature without a solvent. In some embodiments, the amount of the aqueous catalyst may be selected such that about 1.45 equivalents of water per monomer are added. In other embodiments, the amount of the aqueous catalyst may be selected such that about 1.4-1.6, or 1.3-1.7 equivalents of water per monomer are added. In some embodiments, the amount of the photocurable silane monomer may be about 6-20 mol % of the tetraalkoxysilane monomer. In other embodiments, the amount of the photocurable silane monomer may be greater than about 6, 7, 8, 9, 10, 11, 12, 13, 14, 15, 16, 17, 18, 19, 20, 21, 22, 23, 24, or 25 mol % of the tetraalkoxysilane monomer.

In some embodiments, the method of producing a liquid silica resin may additionally include adding a polymerization inhibitor to the reaction vessel. As a non-limiting example, the polymerization inhibitor may be monomethyl ether hydroquinone (MEHQ), hydroquinone, another quinone-based inhibitor, or another free radical inhibitor. In some embodiments, the condensation temperature may be about 57° C. In some embodiments, the method of producing a liquid silica resin may additionally include mixing a photosensitizer with the liquid silica resin. As non-limiting examples, the photosensitizer may be bis(diethylamino) benzophenone, 4,4'-Bis(dimethylamino)benzophenone, 4-(Dimethylamino)benzophenone or another UV polymerization initiator. In preferred embodiments, the resin may be configured to be cured via two-photon polymerization.

In some embodiments, the present invention features a method of printing a three-dimensional glass microstructure with low shrinkage. As a non-limiting example, the method may include: providing a liquid silica resin comprising a high-silica-content oligomer having a covalently linked photopolymerizable moiety; depositing the resin on a substrate; curing a portion of the deposited resin via UV exposure; heating the cured resin to a pyrolysis temperature so as to pyrolyze a non-silica component of the resin; and heating the pyrolyzed resin to a sintering temperature so as to convert the pyrolyzed resin to silica; wherein the silica forms the glass microstructure. The method may additionally include washing away an uncured portion of the deposited resin via a solvent. As non-limiting examples, the solvent may be propylene glycol mono methyl ether acetate (PGMEA), methanol, or ethanol. The liquid silica resin may be cured via a two-photon polymerization via a laser pulse with an energy between about 0.8 and 1.7 nJ and in an exposure time between about 0.1 and 150 seconds. The pyrolysis temperature may be about 600-800° C. and the sintering temperature may be about 1000-1300° C. In selected embodiments, the resulting silica is transparent. In some embodiments, the resulting silica may have a surface roughness of less than 10 nm.

In some embodiments, the present invention features a method of aligning a plurality of glass micro-structured optical elements. As a non-limiting example, the method may include: printing a plurality of three dimensional microstructures via a silica resin for three comprising a high-silica-content oligomer having a covalently linked photopolymerizable moiety; and heating the printed microstructures to a sintering temperature so as to convert the resin to silica, thereby generating the optical elements from the microstructures; where the microstructures are printed in an arrangement such that they are aligned as they are generated via sintering. The resin may be the product of a condensation reaction between a tetraalkoxysilane monomer and a photocurable silane monomer. In some embodiments, the photocurable silane monomer may be between 6.4 and 20 mol % of the mixture of the tetraalkoxysilane monomer and the photocurable silane monomer.

EXAMPLES

The following are non-limiting examples of the present invention. It is to be understood that said examples are not intended to limit the present invention in any way. Equivalents or substitutes are within the scope of the present invention.

Example 1

Introduction

While there have been tremendous advances in additive manufacturing (AM), 3D printing of optics has lagged because of the stringent requirements on surface shape, surface roughness, and homogeneity in optical properties, as well as a limited selection of printable optical materials.

Various printing methods, such as fused filament fabrication (FFF), direct ink writing (DIW), stereolithography (STL), projection microstereolithography (PμSL), and two-photon stereolithography (TPSL), have been utilized to print inorganic glass. However, the printing of high quality optics has not been reached either due to the limitation of the printing techniques or the materials that serve for different printing techniques.

The glass printed by FFF has the benefits from the low shrinkage but suffers from low resolution which is mainly limited by the nozzle of the FFF printer. DIW, STL, PμSL, and TPSL can usually reach higher resolution. To serve for these techniques to print glass, two types of materials have been reported. One type of material is prepared by mixing organosilicon analog together with other photocurable organic monomers and crosslinkers. By pyrolyzing and sintering the printed parts at elevated temperature, transparent silica glass can be obtained. The glass components can be tuned by introducing additives, such as triethyl phosphate (TEP) and trimethyl borate, during the material preparation. However, high volume of the organic parts makes the linear shrinkage higher than 50% after sintering. Large amount of micro-sized pores generated during pyrolysis also limits the surface roughness.

Another branch of materials called nanocomposite may be prepared either through sol-gel chemistry or by mechanically mixing fumed silica particles with curable organic resin. Upon printing, the organic part in the nanocomposite can be burned out and the remaining inorganic part can be sintered to condensed glass. When sol-gel chemistry is used to prepare the nanocomposite for DIW, metal alkoxide can also be introduced into the composite to tune the refractive index of final glass. However, the silica loading in this material is limited by the rheology requirement of DIW. Thus, high shrinkage is inevitable. Moreover, for objects printed with this system, polishing is also needed to get a transparent surface, which makes this method unsuitable for micro-sized optics. When the silica nanocomposite is prepared with fumed silica particles and curable organic resins, the limit of particle loading still leads to high shrinkage. Although the particle loading of some cases can reach as high as 80 wt %, the high viscosity of those nanocomposites make them unsuitable for current 3D printing techniques. Meanwhile, when the nanocomposite is prepared by fumed silica particles, particle clusters become a concern as they may affect the surface roughness and morphology of final glass. Therefore, it is necessary to develop a low viscosity, liquid, inorganic resin that would permit high resolution STL, PµSL and TPSL printing with minimal shrinkage.

Monomer Choice for Solvent-Free LSR, Pyrolysis, Sintering, and Shrinkage

Identifying a liquid resin that can be thermally or photo-chemically cured into a glass is made more difficult due to the propensity of most inorganic compounds to form solids. Organic liquid resins are low molecular weight oligomers with pendant monomer substituents that most commonly will crosslink with light or heat induced radical generation for initiators. These resins have minimal shrinkage because a majority of the linkages between monomers are already in place and only a few additional bonds are needed to connect all of the oligomers into a glassy solid.

Figure 2:
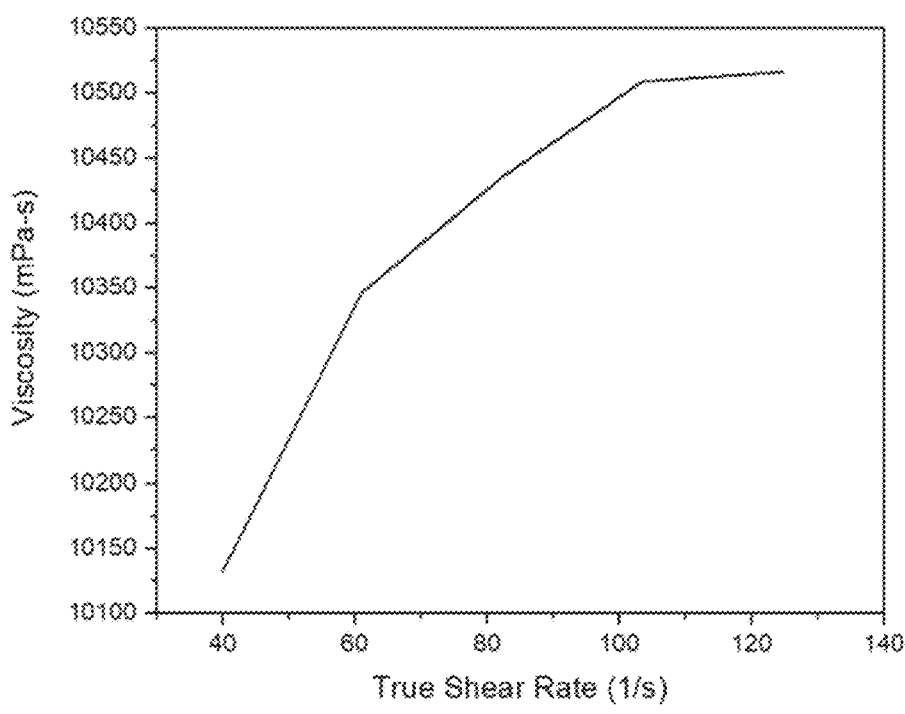
FIG. 2 shows a graph of the viscosity of the precursor prepared with 6.5 mol % of MATS. The viscosity increased gradually as the shear rate increased from 40-1 to 120-1 indicating the precursor has a shear thickening property.
Figure 3:
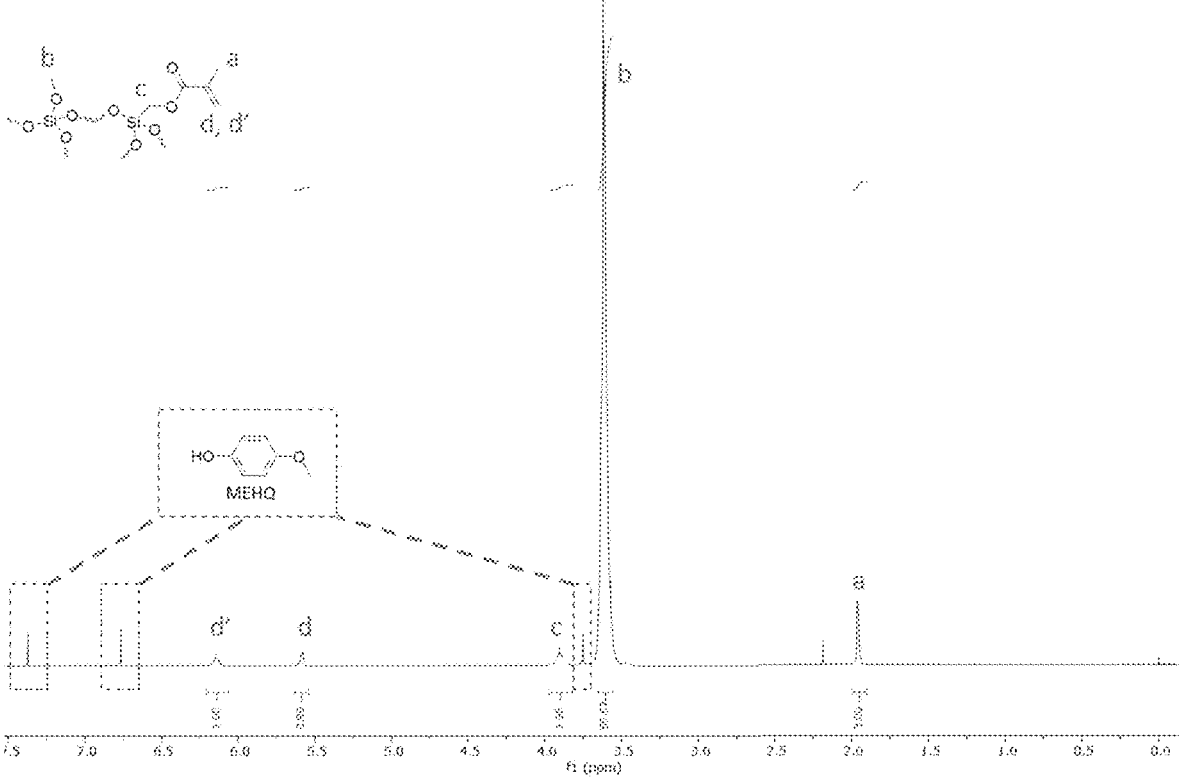
FIG. 3 shows the 1H NMR spectrum of an LSR prepared with 1.45 eq of water and 6.5 mol % of MMTS. The integrals of peak a (1.96 ppm) and peak b (3.62 ppm) indicate that after the pre-condensation, there were around 5.3 methyl methacrylate groups per 100 methoxy groups.

For an inorganic oxide glass, the resin should have a significant portion of the M-O-M linkages already in place. Linear silicone oligomers have half Si—O—Si linkages needed for silica but possess at least 40 wt % organic groups. Conversion of silicones, with densities of 0.965 g/mL$^3$ to amorphous silica with a density of 2.26 g/mL would result in 68% shrinkage after oxidation and sintering. The Si—O—Si content can be increased with silsesquioxanes, $RSiO_{1.5}$, but the ultimate liquid resins are precondensed LSR's developed to create ultra-low density aerogels. Partial condensation of tetramethoxysilane (TMOS) replaces nearly all of the methoxide groups with Si—O—Si linkages in a branched and cyclic rich LSR that, if low enough in molecular weight, can remain liquid. For example, LSR's can be obtained with 27 wt % of TMOS in methanol with 1.5 eq water and HCl as catalyst. With 1.6 eq of water per mole of TMOS, a solid, but soluble resin was obtained and with more than 1.6 eq of water, the resin irreversibly forms a gel. Unfortunately, the pure TMOS based LSR's did not cure with exposure to the UV. This was remedied by incorporating a small amount of 3-methacryloxypropyltrimethoxysilane (MPTS) or meth-acryloxymethyltrimethoxysilane (MMTS) into the hydrolysis and condensation reaction. Reacting TMOS and 6.5 mol % MMTS with 1.45 eq of water and a photo-initiator, afforded an LSR with a viscosity suitable for printing (10131 mP-s, shear rate of 40 s$^{-1}$, FIG. 2). The degree of condensation in the LSRs were verified by comparing the integrals of methyl peak from methyl methacrylate group (1.96 ppm) and methoxy peak (3.62 ppm) in $^1$H NMR (FIG. 3). Some of the pre-condensed LSRs of the present invention have densities close to 1.5 g/mL (e.g. the LSR prepared with 6.5 mol % MMTS has density of 1.48 g/mL), which is much closer than silicone resins to the density of amorphous silica.

Figures 4A, 4B:
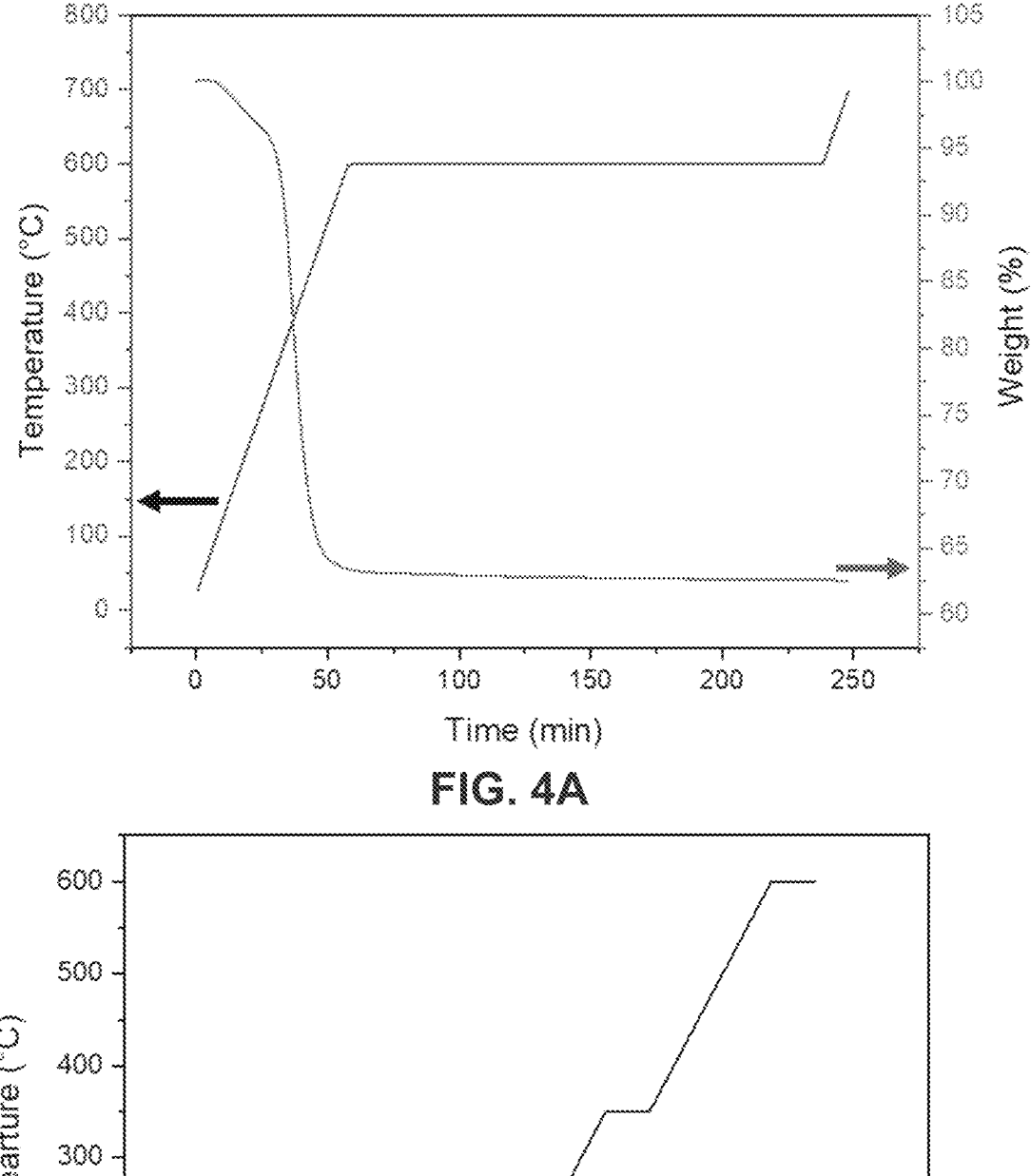
FIG. 4A shows the TGA result of the cured sample prepared with 6.5 mol % of MATS. The first mass drop which started around 130° C. indicates the starting of condensation of —OMe group. The second mass drop which started around 350° C. corresponds to the decomposition and oxidation process.
FIG. 4B shows the process of heating treatment. The heating ramp before 200° C. was controlled as 1° C./min, and the ramp after 200° C. was controlled as 0.5° C./min. The holdings at 160° C. and 200° C. were aimed to finish the condensation of the —OMe group.
Figure 5A:
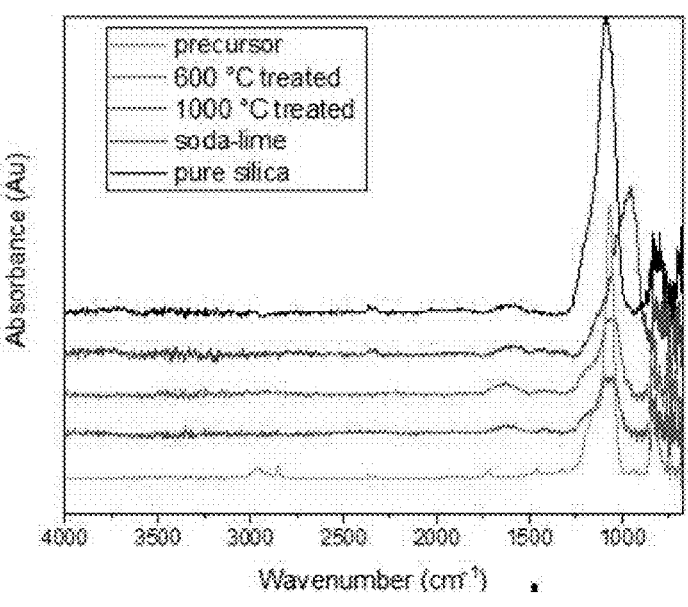
FIGS. 5A-5E illustrate shrinkage and chemical composition after thermal treatment.

To obtain inorganic glass elements, 3D printed samples were heated at 600° C. and then 1000° C. Based on thermal gravimetric analysis (TGA) result (FIG. 4), residual methanol and water are lost around 100° C., followed by loss of methanol and water from methoxide group and silanol condensation reactions and oxidation of the organic substituents. Above 570° C., there was little change in mass. Change in chemical composition of the printed samples was monitored through thermal treatment using FTIR. While the FTIR spectrum of LSR showed peaks from hydrocarbons (2832-3050 cm$^{-1}$, 1465 cm$^{-1}$) and methacrylate C═O (1725 cm$^{-1}$), spectra of the thermally treated printed sample after 600° C. and 1000° C. exhibited only peaks from Si—O (927-1300 cm$^{-1}$) characteristic of silica and trace amounts of absorbed water (~1610 cm$^{-1}$) (FIG. 5A). At this point, the material is inorganic silica of excellent transparency consistent with a nonporous glass, but with significantly lower temperatures than other reported 3D printing approaches.

Figure 5B:
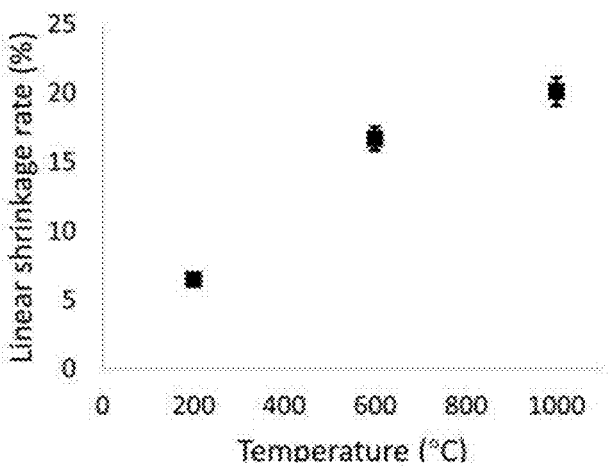
Figure 5C:
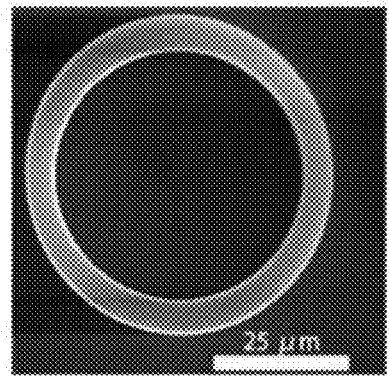
Figure 5D:
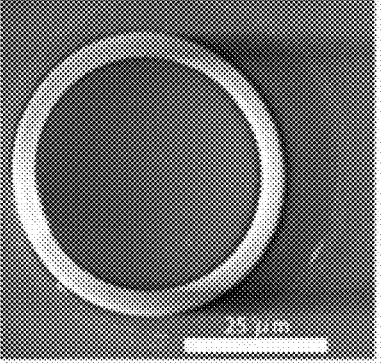
Figure 5E:
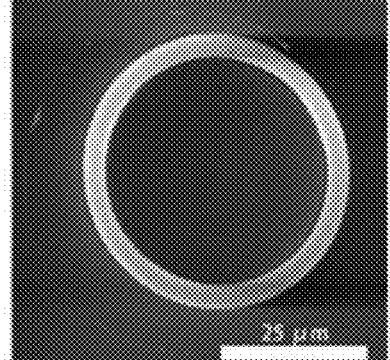

With 12 mol % of the MPTS, 26% shrinkage was observed in the printed sample with pyrolysis (FIG. 5B). When MPTS was reduced to 6.5 mol %, the shrinkage after 600° C. decreased to 19%. Additional reduction in shrinkage was afforded by switching from the propylene tether in MPTS between the methacryloxy and the trimethoxysilane groups to a shorter methylene in methacryloxymethylt-rimethoxysilane (MMTS). Glass rings (FIG. 5C) printed using an LSR prepared with 6.5 mol % of MMTS exhibited only 17% linear shrinkage was generated after being heated at 600° C. for 3 hours (FIG. 5D). After being heated to 1000° C. for another 3 hours, only another 4% shrinkage was observed (FIG. 5E). Reducing the MMTS to 3 mol % provided insignificant difference to shrinkage (≤1%). Besides, it was noticed that at 3 mol %, the concentration of methacrylate attached to the oligomeric silica was too low (only 3 methacrylates per 100 Si atoms) to effectively crosslink the LSR. Thus, LSR prepared with 6.5 mol % MMTS was used in the example of printing micro-optics.

Another phenomenon that has been noticed is that the condensation of the as-printed objects without thermal treatment underwent about 8% linear shrinkage after two months' storage in the air at room temperature, which is probably caused by the moisture from air. However, this will not affect the overall shrinkage after thermal treatment compared to the as-printed status.

Printing Optimization and Resolution

Figures 6A, 6B, 6C, 7A, 7B:
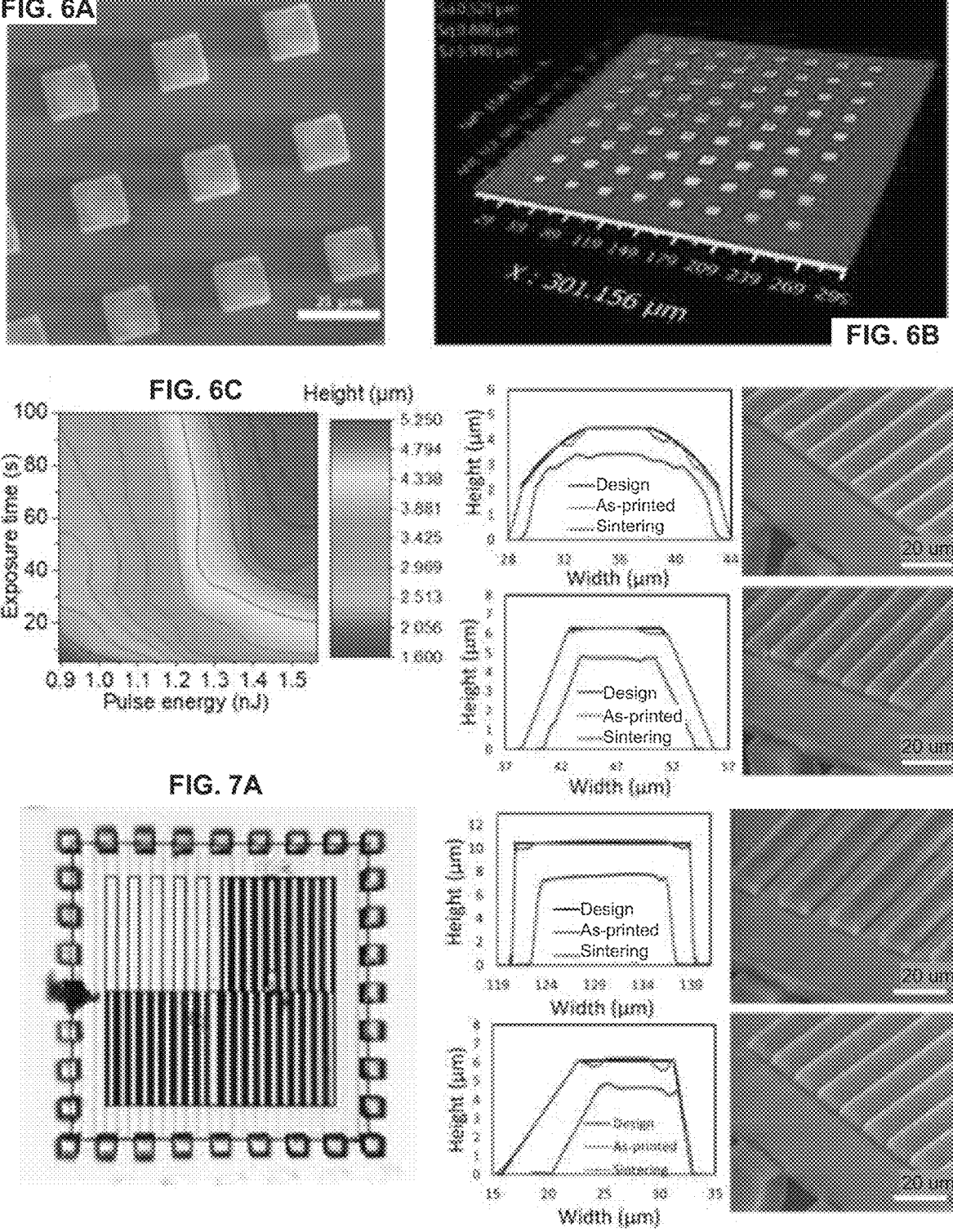
FIGS. 6A-6C illustrate the evaluation of the printing performance of the material prepared with 6.5 mol % of MMTS.
FIGS. 7A-7B illustrate evaluation of material shrinkage with different geometric shapes.
Figures 11A, 11B, 12A, 12B, 12C, 13:
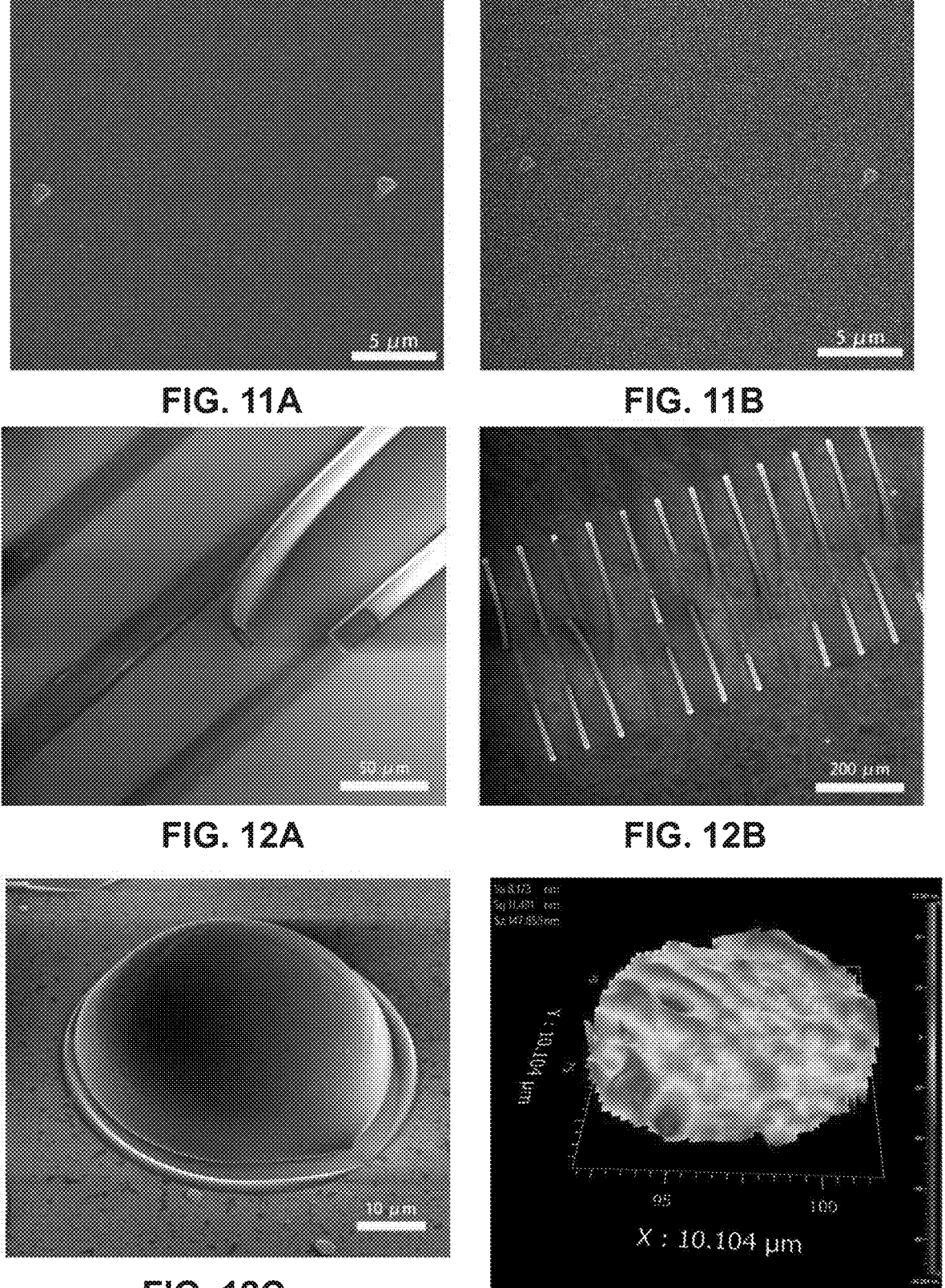
FIGS. 11A-11B show SEM images of the cured dots for evaluating the printing resolution. The sample was coated with gold before SEM. 11A shows the dots after printing.
FIGS. 12A-12C illustrate the defects observed during the study. All objects were printed on quartz substrate directly.
FIG. 13 shows the measured surface of the fabricated lens in FIG. 5B. RMS surface roughness is 8.17 nm. The measurement was performed with a white light interference microscope.
Figure 15:
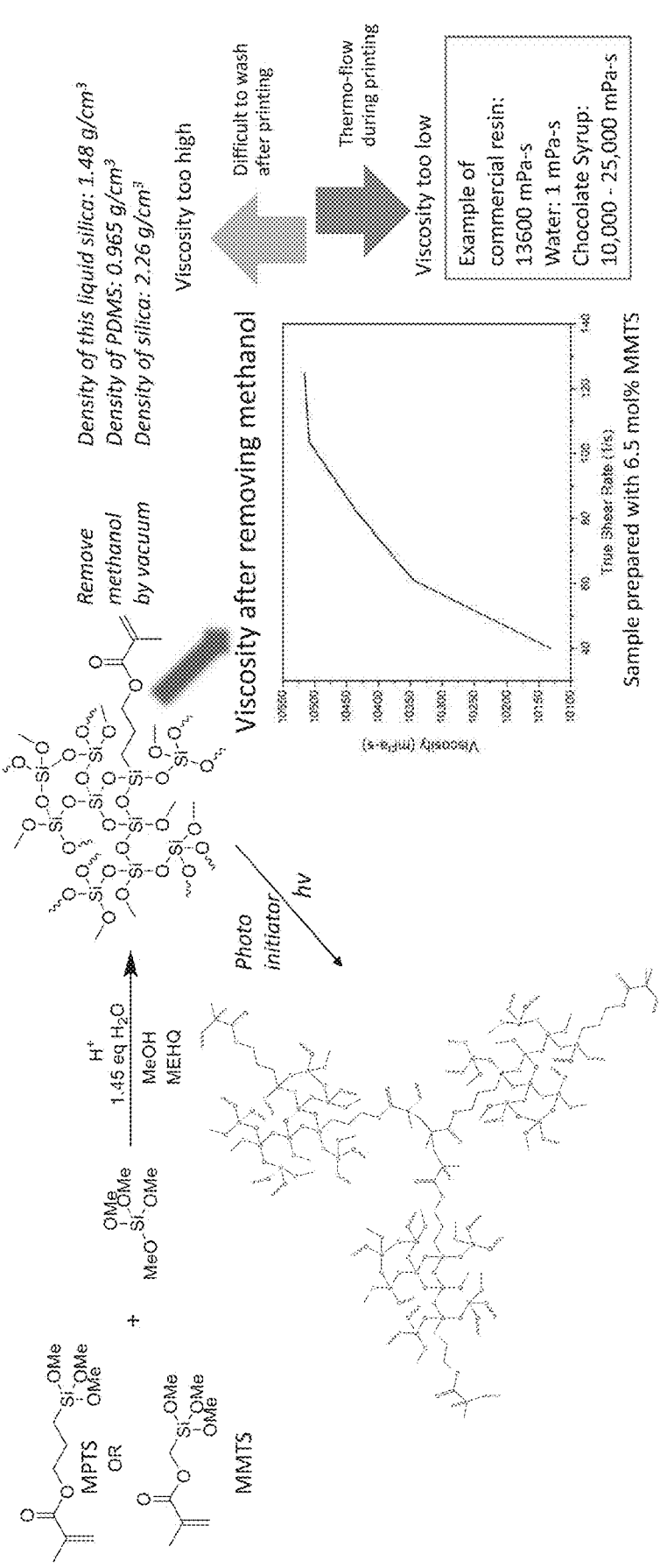
FIG. 15 shows a schematic illustration of the synthesis and curing of liquid silica resins of the present invention.
Figures 16, 17A, 17B, 18:
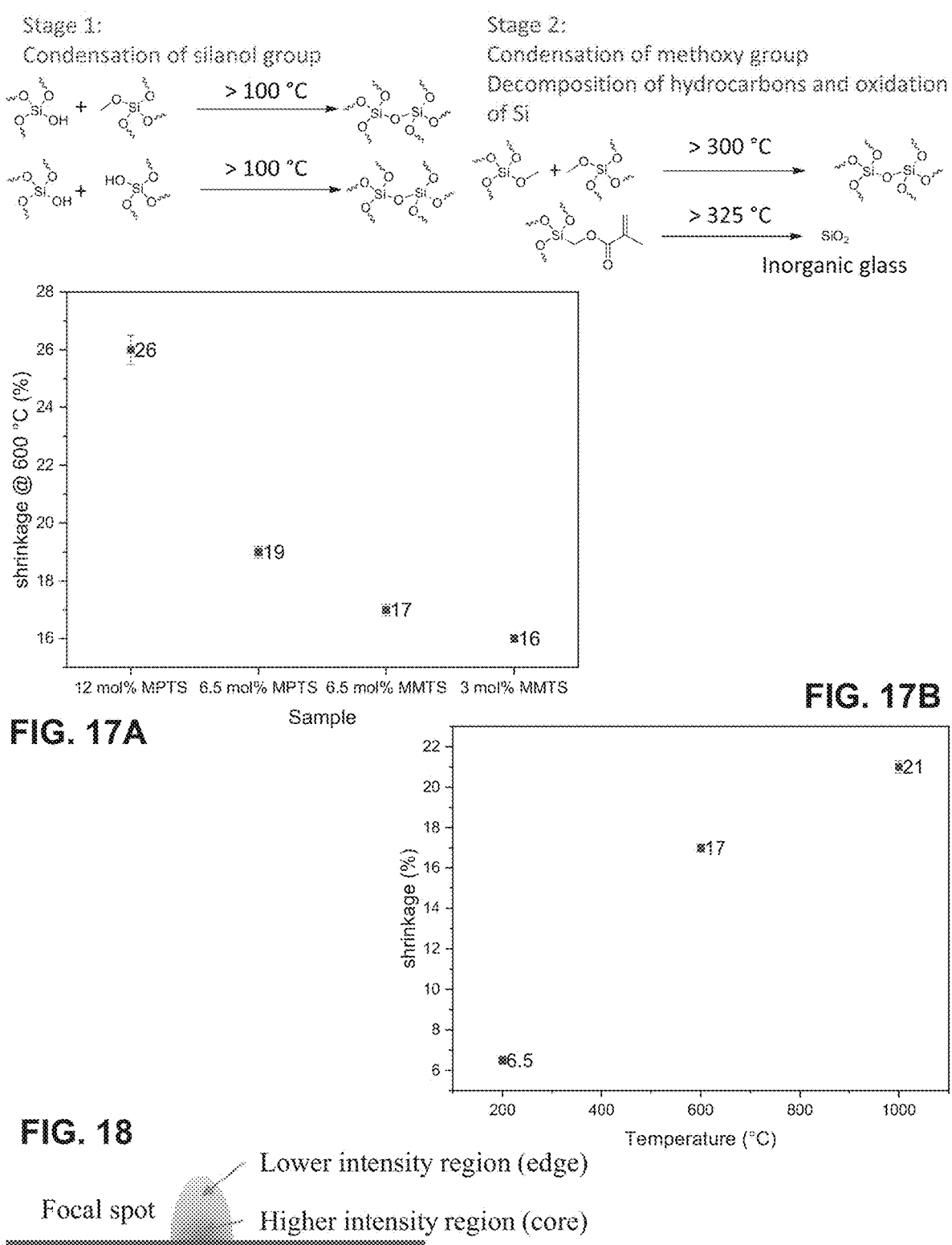
FIG. 16 shows an illustration of example reactions of the present invention.
FIG. 17A shows the shrinkage of the sample at 600° C., prepared with different monomers. The higher carbon chain in MPTS caused higher shrinkage. Less MPTS or MMTS lead to lower shrinkage.
FIG. 17B shows shrinkage of samples heated at different temperatures. The shrinkage difference from 600° C. to 1000° C. is only 4%. The samples were transparent at all temperatures.
FIG. 18 illustrates why prolonging exposure may increase thickness.
Figure 19:
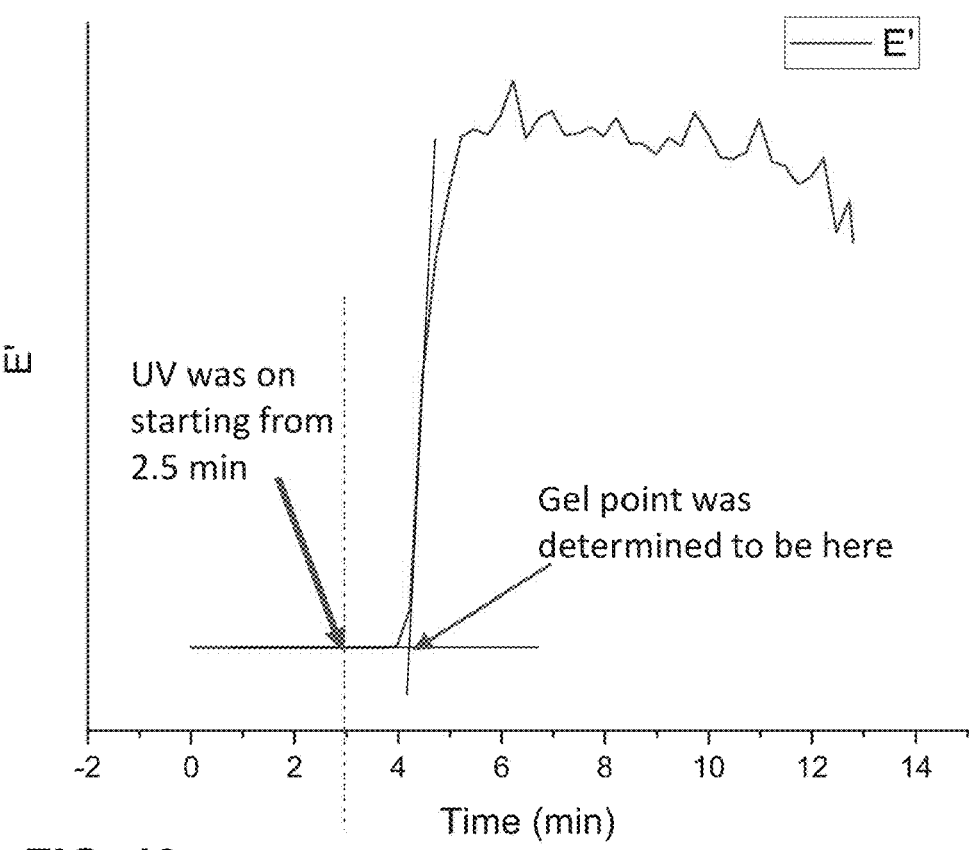
FIG. 19 shows a graph of elastic modulus from dynamic mechanical analysis (DMA) monitoring of the curing performance as well as the modulus after curing.
Figure 20:
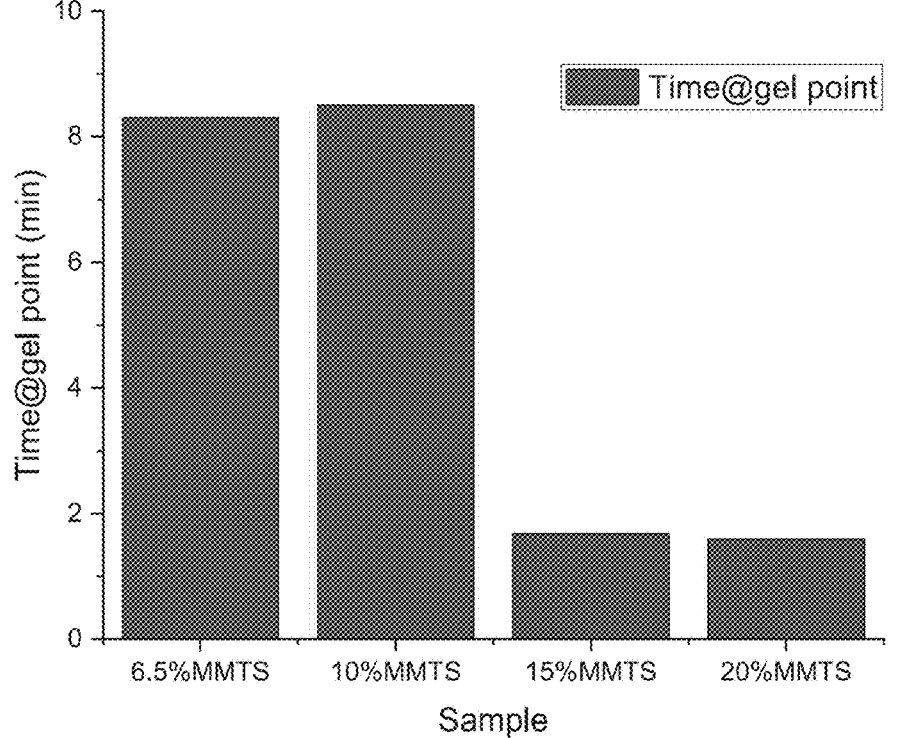
FIG. 20 shows a graph of the gel point of samples prepared with different MMTS content.
Figure 21:
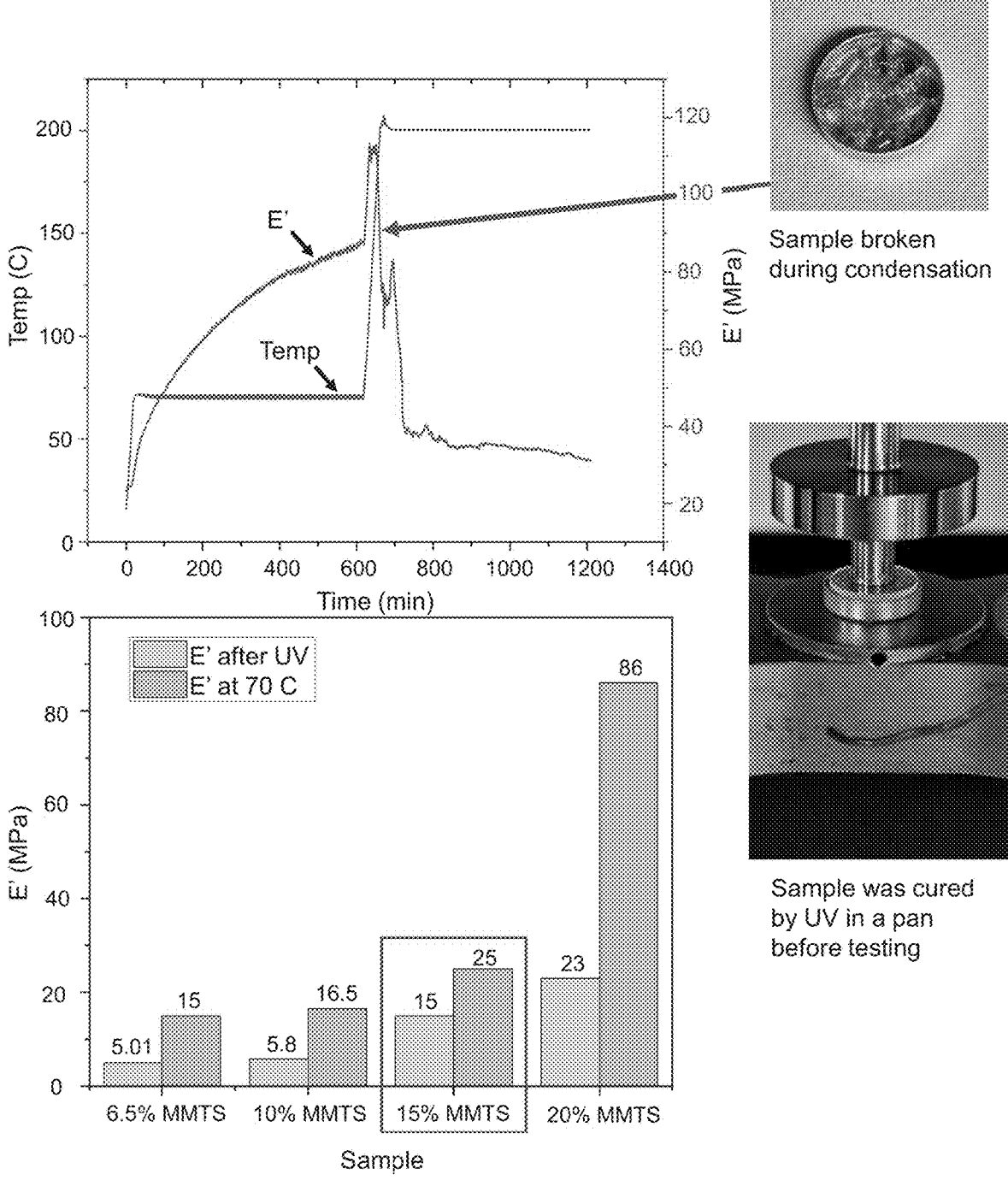
FIG. 21 illustrates how properties of the liquid silica resins may be optimized by varying the MMST content.
Figure 22A:
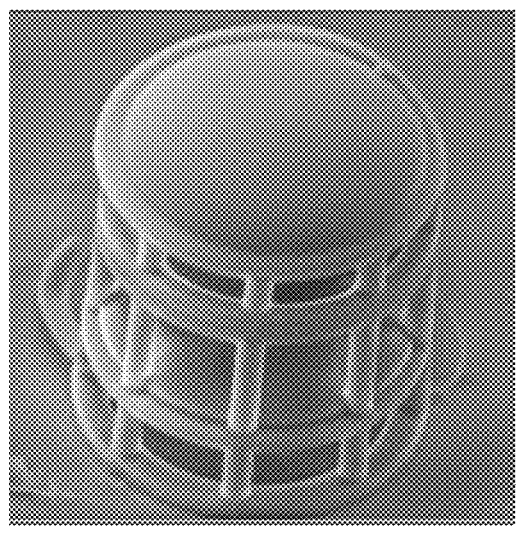
FIG. 22A shows an image of a multi-lens system printed from a liquid silica resin of the present invention, the lens having a diameter of around 200 micrometers.
Figure 22B:
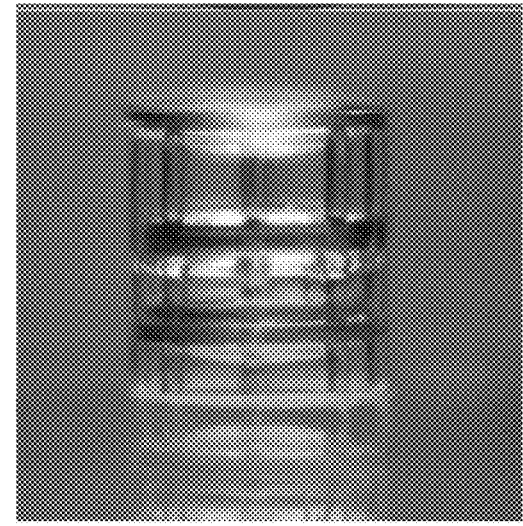
FIG. 22B shows an image of a multi-lens system printed from a liquid silica resin of the present invention, the lens having a diameter of around 200 micrometers.
Figure 22C:
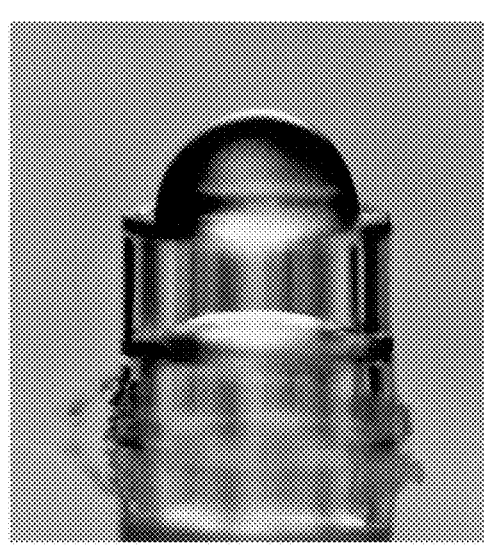
FIG. 22C shows an image of a multi-lens system printed from a liquid silica resin of the present invention, the lens having a diameter of around 200 micrometers.
Figure 22D:
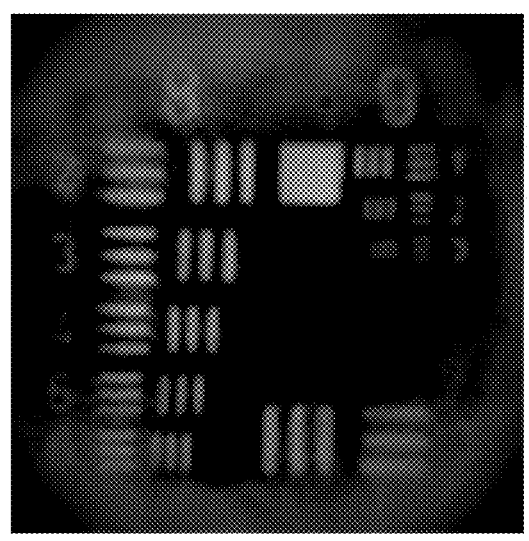
FIG. 22D shows an image of a resolution target taken through the multi-lens system.
Figure 22E:
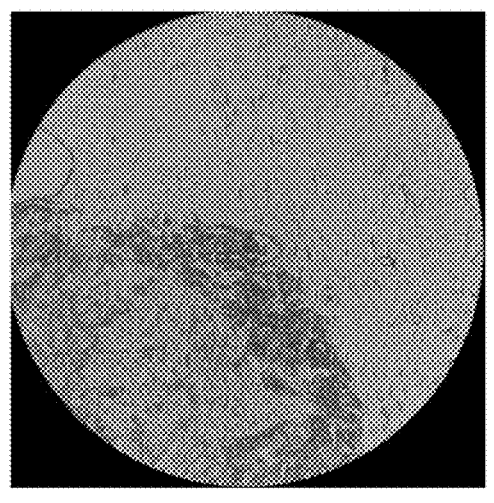
FIG. 22E shows an image of a tissue sample taken through the multi-lens system.
Figure 22F:
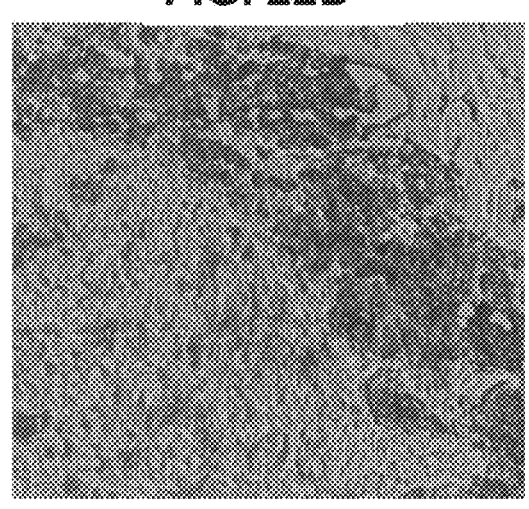
FIG. 22F shows an image of a tissue sample taken through the multi-lens system.

In order to optimize the printing process, an array of thin layer squares was printed on a quartz substrate with a range of laser pulse energies (0.89-1.62 nJ) and exposure times (0.2 s-100 s). The exposure time here was the total time for printing each square. FIG. 6A is the SEM image of a region of printed square arrays, and FIG. 6B is the surface profile using a white light interference microscope. FIG. 6C shows the distribution of the heights of the printed single layer squares for different laser pulse energies and exposure times. It is clear that the layer thickness increased as the pulse energy increased and/or exposure time increased, meaning that the axis resolution of the printing system could be well controlled by the laser pulse energy or exposure time. While higher pulse energy may improve the printing speed, it may also generate enough methanol or water vapor from the curing chemistry to form bubbles in the resulting glass. One more important finding was that the layer thickness was saturated to 5.2 µm even when a longer exposure time (>100 s) was applied. With a 1.25 NA objective, 780 nm fs laser, 0.89 nJ pulse energy, and ~0.2 s exposure time, the smallest printed dot was about 560 nm diameter, which indicated the sub-micrometer printing resolution can be achieved.

Manufacturing Precision and Optical Performance of Printed Glass Micro-Optics

With the information gained from the study in FIG. 6, a number of different micro-optics were directly printed on the quartz substrate to demonstrate the printing capability and investigate the shrinkage after the thermal treatment. However, due to the thermal expansion of the substrate and the shrinkage of the printed element, as well as the friable nature of the prints, cracks were observed during the thermal treatment process, especially for the elements with large aspect ratios or with large contact area with the substrate. Deformation at the edges was also observed even when no crack was observed. To address this critical issue, the contact area between the printed structure and substrate was reduced by pre-printing supporting structures.

FIG. 7A is a grating array which consists of four different grating profiles (semi-sphere, rectangle, isosceles trapezoid, and right-angle trapezoid, as shown in FIG. 7B). The gratings were printed on a platform which was supported by several pillars. The shapes of the gratings were measured with Zygo Newview 8300 optical profilometer before and after thermal treatment. Compared to the design profiles, the gratings were printed accurately except for some minor errors around the corners. After the thermal treatment at 1000° C., the grating shrunk isotropically, the shrinkage rate is 21±0.5%.

A plano-convex micron-lens with a radius curvature of 25 μm was printed on the top four pre-printed pillars as shown in FIG. 8A. Based on the linear shrinkage rate (~17% at 600° C.), the radius curvature of the lens was printed as 30 μm to compensate for the shrinkage. TMS surface roughness was 5.68 nm (FIG. 8B). Surface deviation from the ideal lens surface in the central region was less than ±50 nm (FIG. 8C). To evaluate the imaging performance of the printed micro-lens, an 40×, 0.6 NA microscope objective was used to intermediate image formed by the printed micro-lens (FIG. 8D). FIGS. 8e and 8f are the images of the first element in Group 7 in 1951 USAF resolution target for the printed micro-lens after thermal treatment at 600° C. and 1000° C., demonstrating the printed glass lens has a great potential for imaging application. Since the micro-lens was not designed to correct aberrations under the experimental condition in FIG. 8C, the image was not diffraction limited.

A single diffraction grating was also manufactured. FIG. 9a is the SEM images of the grating with a right-triangle profile with the period of 15 μm and height of 8.5 μm. Although a tiny piece of the platform was broken during the thermal treatment, the whole grating structure was well maintained. FIG. 9b is the diffraction pattern for the collimated 632.8 nm laser beam from the grating. The central bright spot is observed because the laser beam was larger than the grating.

Conclusion

In summary, this example features solvent-free, methacryloxy-modified LSRs and TPP-based 3D printing for glass micro-optics. The modification of LSR with as little as 6.5 mol % MMTS significantly reduces the organic component and shrinkage with pyrolysis. Transparent glass optics can be obtained after thermal treatment at 600° C. with shrinkage as low as 17%, which was also demonstrated to be isotropic. By pre-printing the supporting structure, deformation and damage of printed optics during thermal treatment can be avoided. Glass micro-lenses and gratings were successfully fabricated, and the optical performance was evaluated. The deviation's peak-to-valley value of the surface deviation is lower than ⅙λ (λ is 632.8 nm) and the surface roughness is lower than 6 nm.

The current printing process of micro-optics was achieved with LSR prepared with 6.5 mol % MMTS. When a larger lens or a multi-lens system is desired, tuning the ratio of MMTS may still be required to reach a higher crosslinking density to get better mechanical properties during/after printing. Therefore, it is necessary to optimize the LSR for different optical applications to find a balance point between shrinkage and printability. The printing parameters can be further optimized with regard to different LSR to optimize the resolution as well as printing speed. This same method may be used to synthesize materials with higher refractive index and larger dispersion, so as to better control monochromatic and chromatic aberrations.

The results reported here show fabrication of glass micro-optics by TPP with precision curing of fine details with low and isotropic shrinkage. This method allows for precision fabrication of the complex micro-optics such as freeform lens or gratings. As such, the present invention may expend the applications of micro-optics in imaging, sensing and optical communications.

Example 2

Methanol (8.300 g, 259.3 mmol), methacryloxymethyltrimethoxysilane (0.320 g 1.5 mmol) and tetramethoxysilane (3.200 g, 21.0 mmol) were added to a flame dried 100 mL round bottom flask. monomethyl ether hydroquinone (5 mg, 0.04 mmol) was added as an inhibitor. Then, dilute HCl (0.586 g, 1 M) was added dropwise under magnetic stirring. The solution in the flask was heated at 57° C. for 4 h to pre-condense the silanes. After that, the methanol was evaporated using rotary evaporator. The viscous oil was then transferred into a vial and dried under vacuum (~1 mmHg) for 24 h to remove trace amounts of HCl. Then, bis(diethylamino)benzophenone (0.8 wt % to final LSR) was dissolved in 1 mL of dry methanol followed by being mixed with the pre-condensed LSR. Upon the clear and homogeneous solution was formed, the methanol was removed under vacuum (~1 mmHg) for another 24 h to obtain the transparent, yellow, viscous oil.

Example 3

Methanol (8.300 g 259.3 mmol), 3-methacryloxypropyltrimethoxysilane (0.361 g, 1.5 mmol) and tetramethoxysilane (3.200 g, 21.0 mmol) were added to a flame dried 100 mL round bottom flask. monomethyl ether hydroquinone (MEHQ) (5 mg, 0.04 mmol) was added as an inhibitor. Then, dilute HCl (0.586 g, 1 M) was added dropwise under magnetic stirring. The solution in the flask was heated at 57° C. for 4 h to pre-condense the silanes. After that, the methanol was evaporated using a rotary evaporator. The viscous oil was then transferred into a vial and dried under vacuum (~1 mmHg) for 24 h to remove trace amounts of HCl. Then, bis(diethylamino)benzophenone (0.8 wt % to final LSR) was dissolved in 1 mL of dry methanol followed by being mixed with the pre-condensed LSR. Upon the clear and homogeneous solution was formed, the methanol was removed under vacuum (~1 mmHg) for another 24 h to obtain the transparent, yellow, viscous oil.

Example 4

Ethanol (8.300 g 259.3 mmol), methacryloxypropyltriethoxysilane (0.435 g, 1.5 mmol) and tetraethoxysilane (4.374 g, 21.0 mmol) are added to a flame dried 100 mL round bottom flask. MEHQ (5 mg, 0.04 mmol) is added as an inhibitor. Then, dilute HCl (0.586 g, 1 M) is added dropwise under magnetic stirring. The solution in the flask is heated at 57° C. for 4 h to pre-condense the silanes. After that, the methanol is evaporated using a rotary evaporator. The viscous oil was transferred into a vial and dried under vacuum (~1 mmHg) for 24 h to remove trace amounts of HCl. Then, bis(diethylamino)benzophenone (0.8 wt % to final LSR) is dissolved in 1 mL of dry methanol followed by mixing with the pre-condensed LSR. Upon formation of a clear and homogeneous solution, the methanol is removed under vacuum (~1 mmHg) for another 24 h to obtain a transparent, yellow, viscous oil.

Example 5

Ethanol (8.300 g 259.3 mmol), methacryloxymethyltriethoxysilane (0.393 g, 1.5 mmol) and tetraethoxysilane (4.374 g, 21.0 mmol) are added to a flame dried 100 mL round bottom flask. MEHQ (5 mg, 0.04 mmol) is added as an inhibitor. Then, dilute HCl (0.586 g, 1 M) is added dropwise under magnetic stirring. The solution in the flask is heated at 57° C. for 4 h to pre-condense the silanes. After that, the methanol is evaporated using a rotary evaporator. The viscous oil is then transferred into a vial and dried under vacuum (~1 mmHg) for 24 h to remove trace amounts of HCl. Then, bis(diethylamino)benzophenone (0.8 wt % to final LSR) is dissolved in 1 mL of dry methanol followed by mixing with the pre-condensed LSR. Upon formation of a clear and homogeneous solution, the methanol is removed under vacuum (~1 mmHg) for another 24 h to obtain a transparent, yellow, viscous oil.

Example 6

Methanol (8.300 g 259.3 mmol), (3-acryloxypropyl)trimethoxysilane (0.351 g, 1.5 mmol) and tetramethoxysilane (3.200 g, 21.0 mmol) are added to a flame dried 100 mL round bottom flask. MEHQ (5 mg, 0.04 mmol) is added as an inhibitor. Then, dilute HCl (0.586 g, 1 M) is added dropwise under magnetic stirring. The solution in the flask is heated at 57° C. for 4 h to pre-condense the silanes. After that, the methanol is evaporated using a rotary evaporator. The viscous oil is then transferred into a vial and dried under vacuum (~1 mmHg) for 24 h to remove trace amounts of HCl. Then, bis(diethylamino)benzophenone (0.8 wt % to final LSR) is dissolved in 1 mL of dry methanol followed by mixing with the pre-condensed LSR. Upon formation of a clear and homogeneous solution, the methanol is removed under vacuum (~1 mmHg) for another 24 h to obtain a transparent, yellow, viscous oil.

Example 7

Methanol (8.300 g 259.3 mmol), acryloxymethyltrimethoxysilane (0.309 g, 1.5 mmol) and tetramethoxysilane (3.200 g, 21.0 mmol) are added to a flame dried 100 mL round bottom flask. MEHQ (5 mg, 0.04 mmol) is added as an inhibitor. Then, dilute HCl (0.586 g, 1 M) is added dropwise under magnetic stirring. The solution in the flask is heated at 57° C. for 4 h to pre-condense the silanes. After that, the methanol is evaporated using a rotary evaporator. The viscous oil is then transferred into a vial and dried under vacuum (~1 mmHg) for 24 h to remove trace amounts of HCl. Then, bis(diethylamino)benzophenone (0.8 wt % to final LSR) is dissolved in 1 mL of dry methanol followed by being mixed with the pre-condensed LSR. Upon formation of a clear and homogeneous solution, the methanol is removed under vacuum (~1 mmHg) for another 24 h to obtain a transparent, yellow, viscous oil.

Example 8: High-Precision Printing of Complex Glass Imaging Optics with Pre-Condensed Liquid Silica Resin 3D printing of optics has gained significant attention in the optical industry, but most of the research has been focused on organic polymers. In spite of recent progress in 3D printing glass, 3D printing of precision glass optics for imaging applications still faces challenges from shrinkage during printing and thermal processing, and from inadequate surface shape and quality to meet the requirements for imaging applications. This example features a new liquid silica resin (LSR) with higher curing speed, better mechanical properties, lower sintering temperature, and reduced shrinkage, as well as the printing process for high-precision glass optics for imaging applications. This example demonstrates that the proposed material and printing process can print almost all types of optical surfaces, including flat, spherical, aspherical, freeform, and discontinuous surfaces, with accurate surface shape and high surface quality for imaging applications. The example also demonstrates that the proposed method can print complex optical systems with multiple optical elements, completely removing the time-consuming and error-prone alignment process. Most importantly, the proposed printing method is able to print optical systems with active moving elements, significantly improving system flexibility and functionality. The printing method enables the much-needed transformational manufacturing of complex freeform glass optics that are currently inaccessible with conventional processes.

Introduction

Inorganic glass has been used for fabricating optics for hundreds of years. Although more and more optics are fabricated from organic polymers due to its light weight and low-cost, inorganic glass still has an irreplaceable position in the optical imaging because of its much better thermal stability, mechanical properties, chemical resistance, and imaging performance in ultraviolet (UV), near-infrared (NIR), and infrared (IR) regions.

Glass micro-optics have been widely used in consumer products, medical devices, sensors, optical communications, and etc. Traditional grinding/polishing, commonly used to fabricate glass optics, is not efficient in fabricating micro-optics and not capable of fabricating freeform micro-optics with discontinuous surfaces. Precision press glass molding, developed for mass production of glass optics, is a preferred method for fabricating low cost micro-optics, but cannot be used to fabricate multi-element components and freeform optics with microstructures. In recent years, additive manufacturing (AM), or three-dimensional (3D) printing, has been used to fabricate small and complicated structures that conventional techniques cannot achieve. A variety of AM techniques have been investigated to print glass objects using different materials. However, considering the strict requirements on surface shape and quality for optical applications, the relatively low resolution of some AM techniques (e.g. fused filament fabrication, direct ink writing, and stereolithography) limits their printing glass optics unless post-process (e.g. polishing) is applied to the printed parts, which is not ideal and sometimes impossible. AM technique based on two-photon polymerization (TPP) becomes the best candidate to print glass micro-optics since it has much higher printing resolution.

Until recently, TPP-based AM technique has been used to print high resolution, micro-sized optics based on organic polymers. Micro-optics were 3D printed from silica particles in an organic resin by Frederik Kotz et al using a TPP direct laser writing (DLW) method. Thermal degradation and sintering at 1300° C. afforded silica glass with a linear shrinkage of ~26%. Micro-lenses with diameters of hundreds of micrometers were obtained with $R_a \approx 6$ nm and $S_a$ of hundreds of nanometers. Example 1 features a TPP printing method with a solvent-free, pre-condensed liquid silica resin (LSR) for fabricating micro glass optics with relatively simple structures (e.g. single lens or grating). Transparent glass optics can be obtained after thermal treatment at 600° C. in the air with linear shrinkage as low as 17%. The $S_a$ and $S_q$ of printed semi-sphere lenses reached 4.3 nm and 5.6 nm, respectively. The solvent-free LSR used in our previous work was synthesized based on acid-catalyzed polymerization of tetramethoxysilane (TMOS) together with sub-stoichiometric amount of water (water solution) and 6.5 mol % of methacryloxymethyltrimethoxysilane (MMTS) as photocurable moiety. A limitation was observed that the deformation may happen during the printing and thermal treatment processes if a structure with high aspect ratio is printed, mainly due to the relatively low number of crosslinked points in the printed structure. When a 3-lens objective with high aspect ratio (diameter of 50 μm and height of 100 μm) was printed, the supporting structure was not strong enough to support the whole objective after printing.

This example highlights progress in printing imaging micro-optics with newly optimized LSR. The printed structure can be converted to transparent silica glass at a temperature as low as 600° C. Micro-sized single, freeform, multi-component glass optics with well-controlled profile accuracy (RMS surface roughness ≤5 nm) have been fabricated. The performances of all optical systems have been evaluated to demonstrate the potentials for practical applications.

Figure 23A:
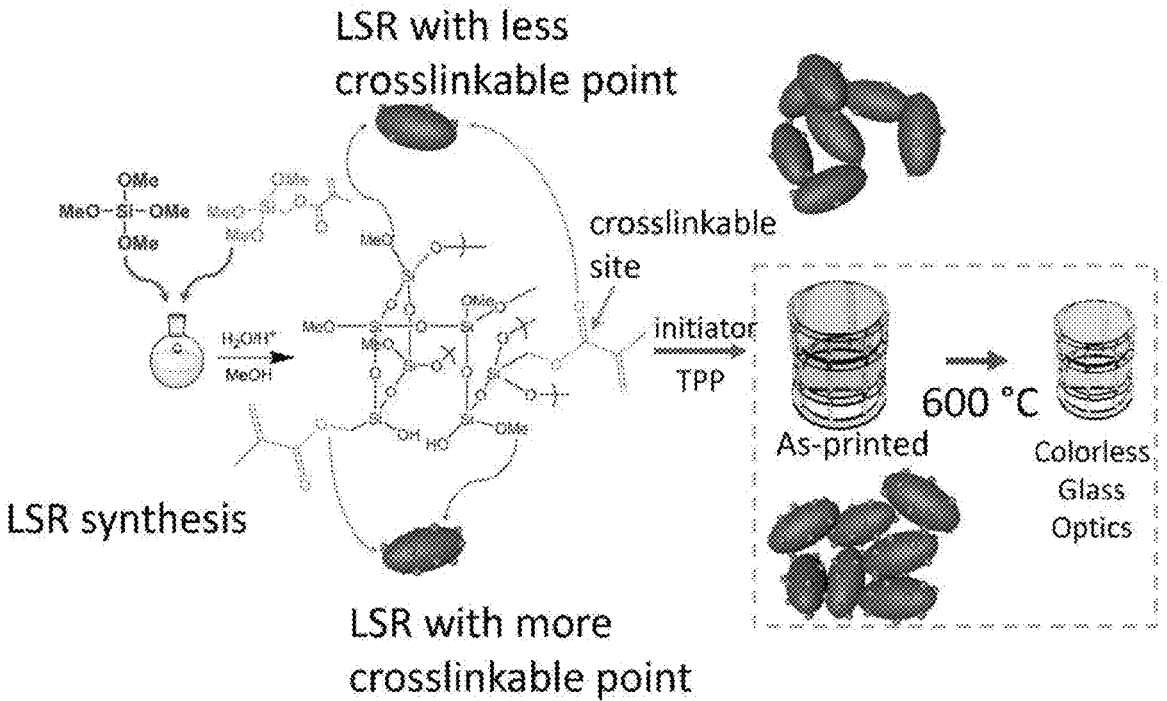
FIG. 23A shows a scheme illustrating LSR synthesis and fabrication of glass micro-optics. The LSR sol may be considered as soft, flexible, and nanometer-sized particles.
Figure 23B:
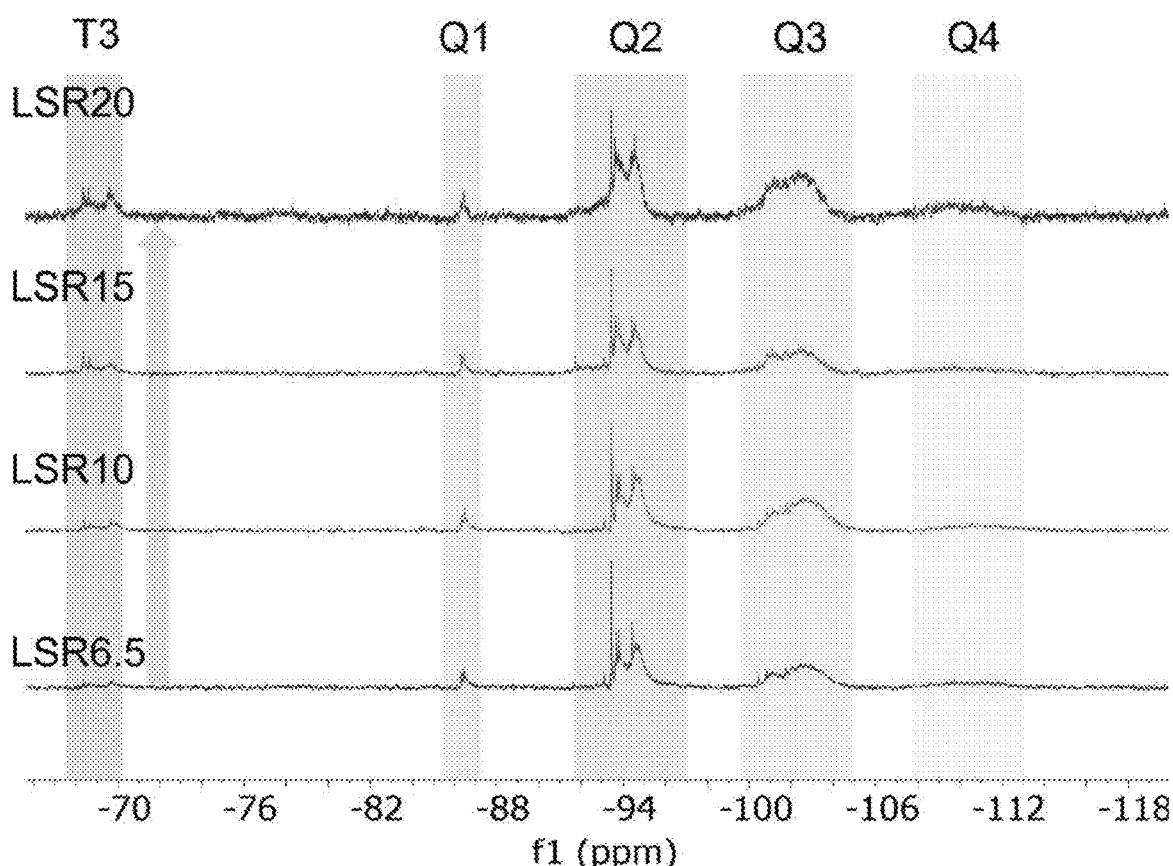
FIG. 23B shows a $^{29}$Si NMR spectra of LSRs.
Figure 23C:
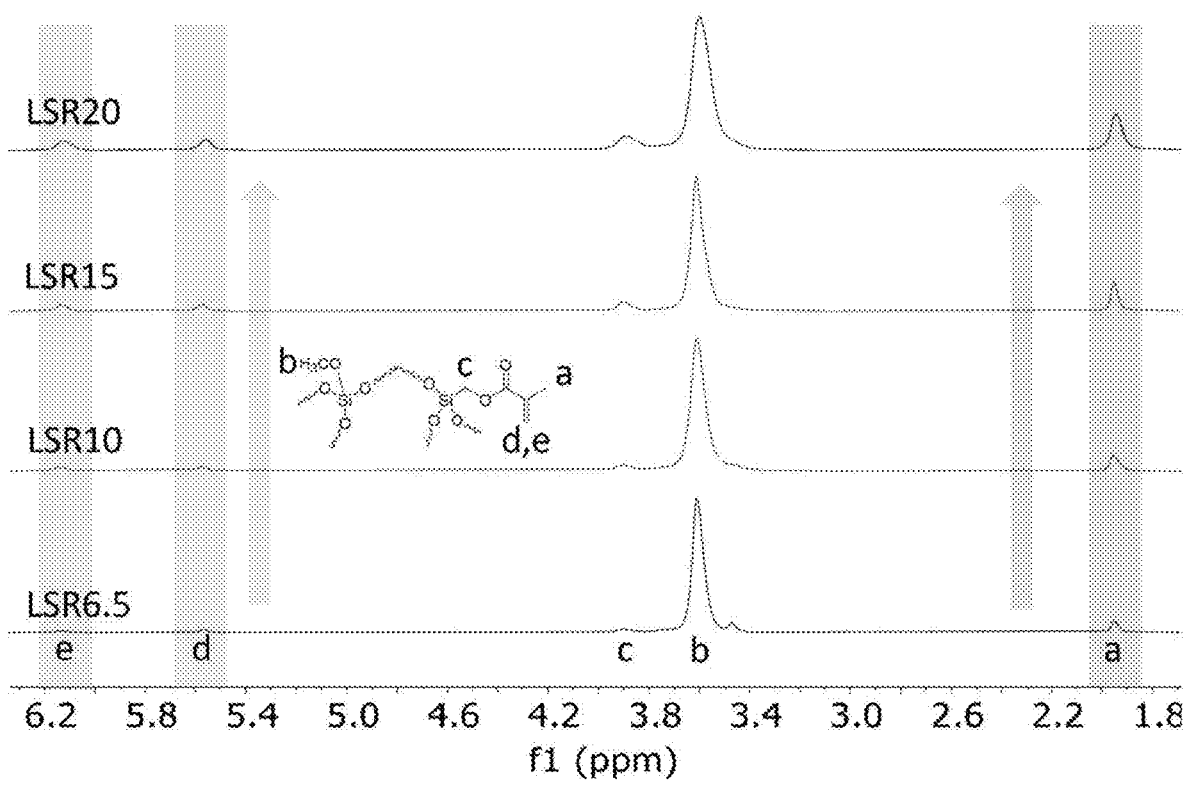
FIG. 23C shows a $^{1}$H NMR spectra of LSRs.
Figure 23D:
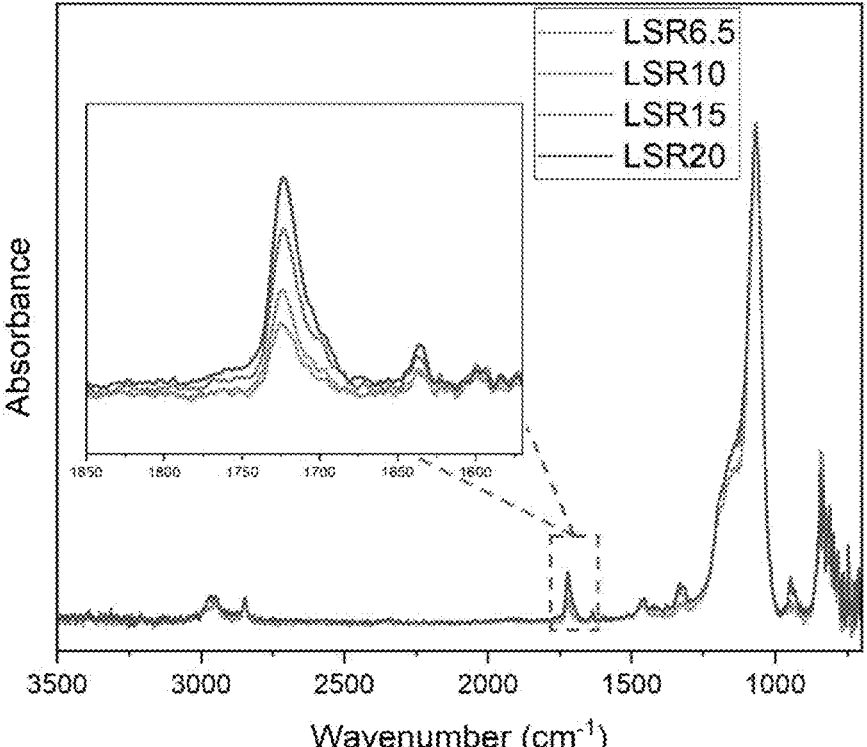
FIG. 23D shows FTIR spectra of LSRs. After normalizing all curves based on Si—O peak (1066 cm$^{-1}$), the ratio of integrations of C=O (1723 cm$^{-1}$) peaks from LSR6.5 to LSR10, to LSR15, to LSR20 is 1:1.5:2.3:3.0.

Pre-Condensed Liquid Silica Resin with Better Curing and Mechanical Properties for Optical Applications To address the deformation challenge, a series of LSRs with increased crosslinkable points (FIG. 23A) were synthesized by adjusting the ratio of MMTS during synthesis. LSRs with different ratios of MMTS varying from 6.5 mol % to 20 mol % were prepared (LSR6.5, LSR10, LSR15, LSR20). Si NMR was used to characterize the chemical structures of LSRs. Peaks in $Q_1$ (−86~−87 ppm), $Q_2$ (−93~−96 ppm), $Q_3$ (−100~−105 ppm), and $Q_4$ (−107~−115 ppm) regions were observed in all LSRs' spectra with almost the same integration ratio ($Q_2 \approx Q_3 >> Q_4 > Q_1$), indicating that the hydrolysis and condensation during synthesis could be well controlled by strictly controlling the ratio of $H_2O$:Si (FIG. 23B). These results are consistent with the spectrum of liquid silica prepared from pure TMOS. Since MMTS was also introduced as comonomer, $T_3$ (−68~−70 ppm) peaks were also observed. The multi-peaks in $T_3$, $Q_2$, and $Q_3$ regions indicate that the LSRs are a mixture of linear, cyclic, and cage-shaped species. From LSR6.5 to LSR20, the increased intensity of $T_3$ peaks is consistent with the increased ratio of methacrylate group in the system, which is also confirmed by the increased intensity of methacrylate peaks (6.13 ppm, 5.97 ppm, 3.90 ppm, and 1.95 ppm) in $^1$H NMR (FIG. 23C) and the increased intensity of C=O peak (1723 cm$^{-1}$) in normalized FTIR spectrum (normalized by the Si—O peak at 1066 cm$^{-1}$) (FIG. 23D).

When the percentage of MMTS is increased, shrinkage increases as well during thermal treatment, which is caused by eliminating a greater volume of the organic methacrylate group. To achieve the high-quality printing for optics, the shrinkage should be kept as low as possible for better control in shape and surface quality. Therefore, it is important to seek an optimized ratio of MMTS that provides sufficient crosslinking points with minimized shrinkage during pyrolysis. The gel point time of LSRs under UV irradiation was measured using Dynamic Mechanical Analysis (DMA) under a tension mode. The LSRs were placed between two glass slides. The UV light was applied to the LSR after a 2.5 minutes stable measurement without UV irradiation.

Figures 24A, 24B, 25A, 25B, 25C, 25D:
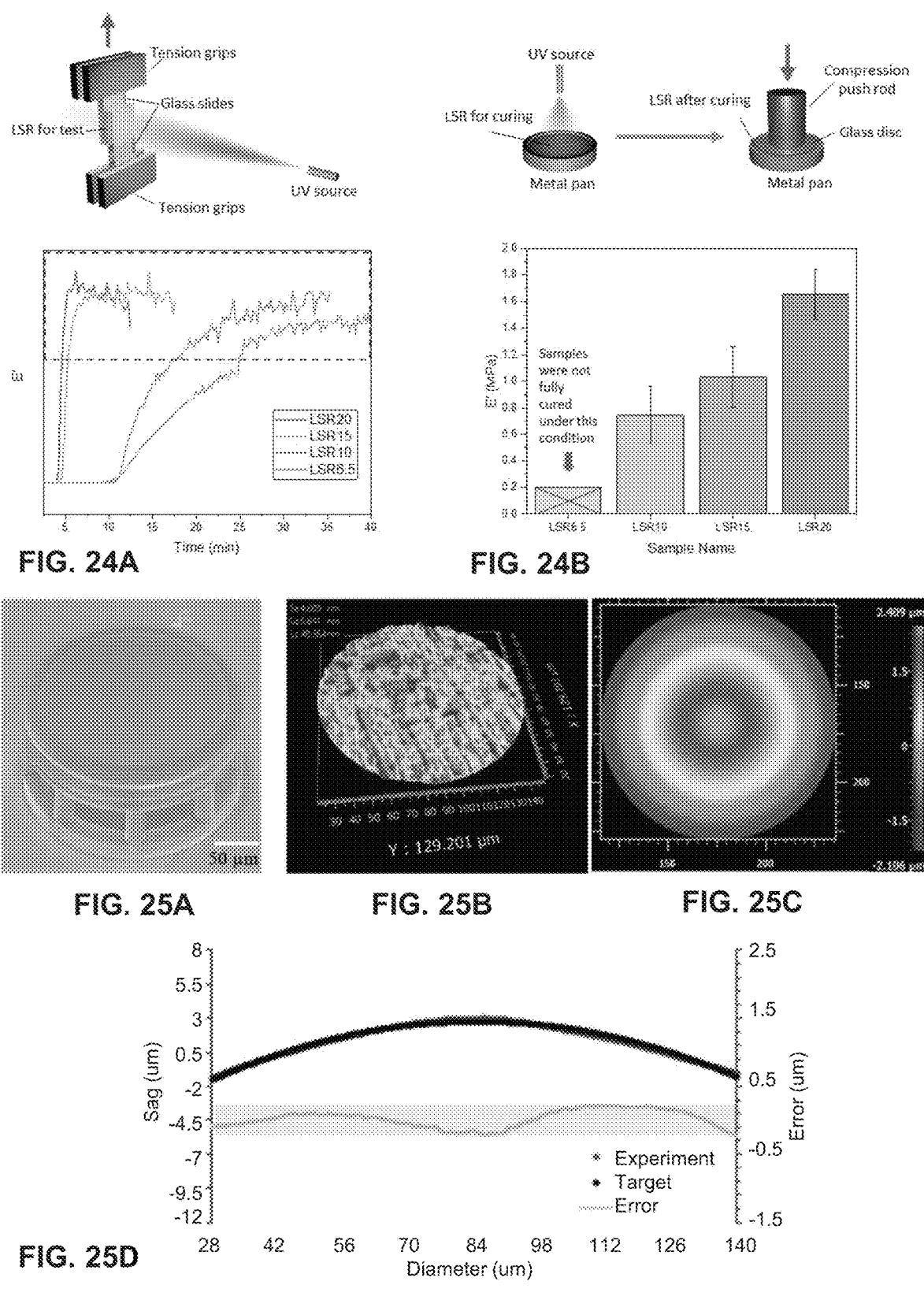
FIG. 24A shows the DMA (tension) results of LSRs between two glass slides exposed to UV. The zig-zag part of each curve in the dashed region refers to the crack formation and broken of LSR at the end of the test, which could be caused by the heat during UV exposure. The gel time of each curve was determined by crossing the baseline with the tangent line of point on curve that E' has the highest raising rate.
FIG. 24B shows the E' of LSRs after curing by normal UV. The tests were conducted under compression mode. The LSR6.5 cannot be fully cured under the condition used for UV curing test.
FIGS. 25A-25D illustrate the surface roughness and shape of the printed optical surface.

The results indicated that LSR10 had a similar curing efficiency as the LSR6.5. When the ratio of MMTS was increased to 15 mol %, a substantial decrease of gel point time (from 8.5 min to 2 min) under the same curing conditions was observed (FIG. 24A), indicating a much higher curing efficiency. Further increasing the MMTS to 20 mol % did not improve the curing efficiency much. The storage modulus (E') of UV-cured LSR was also measured by DMA to evaluate the mechanical properties after curing. To minimize the heat generated by UV, limited UV power (~10 W/cm$^2$, the UV source was 5 cm away from the sample) and 5-minutes exposure time was used. Under such conditions, the LSR6.5 could not be fully cured, and the DMA results were not stable. Meanwhile, LSRs with increased MMTS ratio from 10 mol % to 20 mol % show the increased E' from 0.74 MPa to 1.65 MPa (FIG. 24B). Although the LSR20 had better mechanical properties than LSR15 after curing, to minimize the shrinkage LSR15 was selected for investigation of the printing process for precision optics for imaging applications. The linear shrinkage of LSR15 at 600° C. was measured as 22%, which is higher than the shrinkage of LSR6.5 (17%). This is because the LSR15 contains more organic parts compared to LSR6.5.

High-Precision Printing of Glass Optics with the Optimized Pre-Condensed LSR

A custom printing system was built to study the printing process. A 780 nm femtosecond fiber laser source with ~150 fs, 77 MHZ, and maximum power 130 mw was used for two-photon polymerization. The collimated laser beam was expanded to 5.5 mm diameter by a 5× beam expander. The full-width-half-maximum (FWHM) of the beam was 3.24 mm, 65% filling the objective aperture of the oil immersion objective (NA=1.25). The optical elements were printed with a 1.52 nJ pulse energy and a printing speed of 2.5 mm/s.

The printed elements were immersed in propylene glycol monomethyl ether acetate (PGMEA) for 5 minutes after printing and then immersed in alcohol for another 5 minutes. After washing away the uncured material, the elements were kept at room temperature before thermal treatment. The multi-stage thermal treatment was finished in a Vulcan 3-550 furnace. The printed elements were first heated to 200° C. (1° C./min) and held for 3 hours, followed by being heated to 350° C. (0.5° C./min) and held for 3 hours, and then by a heating ramp to 600° C. (0.5° C./min). After that, the elements were held for another 3 hours before they were cooled to room temperature slowly.

To demonstrate the printing capabilities and evaluate the printing quality for optical imaging applications, the flat element as shown in FIG. 25A was printed on an array of supporting pillars. FIG. 25B shows that the surface roughness is better than 6 nm, which could be further improved by optimizing the printing system with better motion-controlled mechanisms. FIG. 25C is the measured surface shape of a printed spherical surface with a radius of 370 μm and FIG.

25D shows the deviation of the surface profile from the designed radius, demonstrating that the printed lens has a P-V better than 450 nm and an RMS better than 135 nm. No surface deformation was observed before and after thermal treatment. This is attributed to the pre-condensed resin. The resins prepared by sol-gel chemistry are highly homogenous, which avoids the uncontrolled deformation during shrinking. Moreover, the optimized equal-arc printing method ensures the high printing accuracy for the industry standards.

Figure 26A:
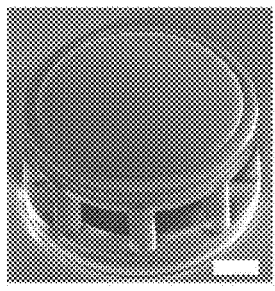
FIG. 26A shows an SEM image of a plano-convex singlet.
Figure 26A:
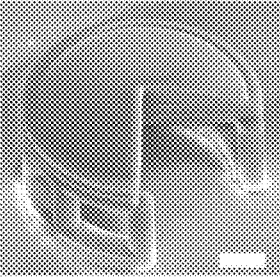
Figure 26B:
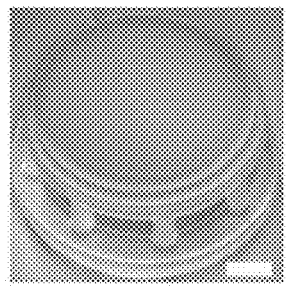
FIG. 26B shows an SEM image of a plano-concave singlet.
Figure 26B:
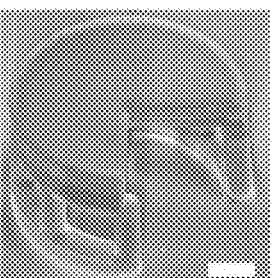
Figure 26C:
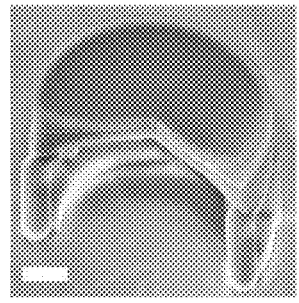
FIG. 26C shows an SEM image of a bi-concave singlet.
Figure 26D:
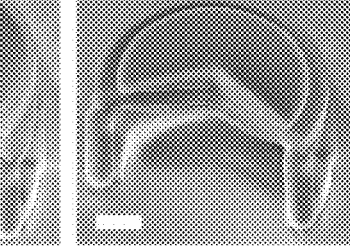
FIG. 26D shows an SEM image of a bi-convex singlet.
Figure 26E:
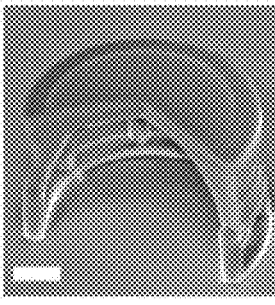
FIG. 26E shows an SEM image of a meniscus lens.
Figure 26F:
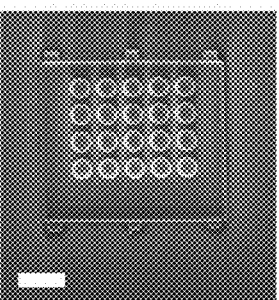
FIG. 26F shows an SEM image of a lenslet array.
Figure 26G:
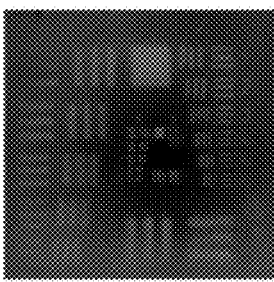
FIG. 26G and FIG. 26H respectively show images of 1951 USAF resolution target captured by the plano-convex singlet in FIG. 26A and the plano-concave singlet in FIG. 26B.
Figure 26H:
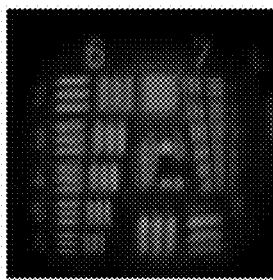
Figure 26I:
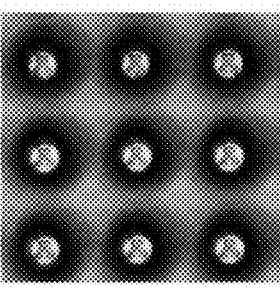
FIG. 26I shows the image of the University of Arizona logo captured by the lenslet array in FIG. 26F. Scale bar: 50 μm.

FIGS. 26A-I show SEM images of singlets with common shapes. FIG. 26A is the plano-convex lens, the left image is the entire lens, and the right image is the ¾ sectioned lens to show the lens shape. The layer-like structure in the cross-section image was caused by the printing process; the internal property is homogenous. FIGS. 26B-F are SEM images of plano-concave, bi-concave, bi-convex, meniscus lens, and lenslet array. This study demonstrates that the reported printing material and process is able to print the lenses with common shapes. FIGS. 26G-I are the images formed by the printed lenses. The printed lens first imaged the target to an intermediate image which was then relayed to the CMOS camera by a microscope, as laid out in FIG. 29C. FIGS. 26G and 26H are the images of the 1951 USAF resolution target captured by the plano-convex singlet in FIG. 26A and the plano-concave singlet in FIG. 26B. The image quality was degraded because the singlet didn't have sufficient freedoms to correct aberrations. The contrast, particularly in FIG. 26G, was relatively low due to the stray light. FIG. 26I is the image of the University of Arizona logo captured by the lenslet array in FIG. 26F.

Figure 27A:
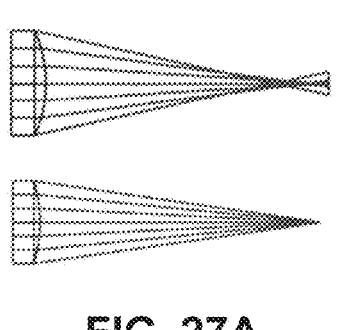
FIGS. 27A-27F illustrate capability in printing aspherical surfaces.

One of the key advantages of the reported printing material and process is its capability in printing aspherical and freeform elements without additional processes. FIG. 27A plots the ray tracing diagrams of two plano-convex singlets with the spherical surface (top) and aspherical surface (bottom) with the same base radius of 220 μm, showing the aspherical surface is very effective in minimizing spherical aberration. The aspherical surface was an even aspherical surface described by the following equation:

$$Z(r) = \frac{cr^2}{1 + \sqrt{1 - (1 + \kappa)c^2 r^2}} + \alpha_2 r^2 + \alpha_4 r^4 + \alpha_6 r^6 \qquad (1)$$

where $R = 220\,\mu m$, $\kappa = -1$, $\alpha_2 = 0.474$, $\alpha_4 = 6.4036$, and $\alpha_6 = -41.454$.

Figure 27B:
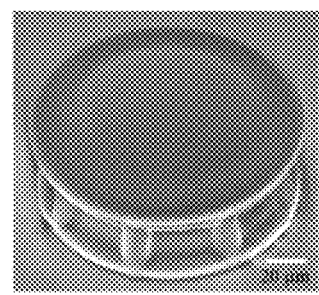
Figure 27C:
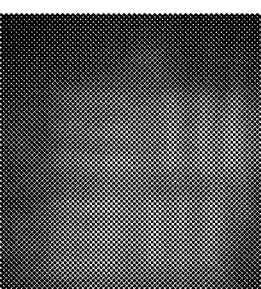
Figure 27D:
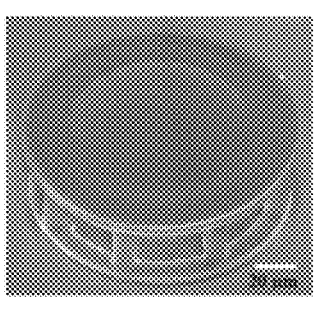
Figure 27E:
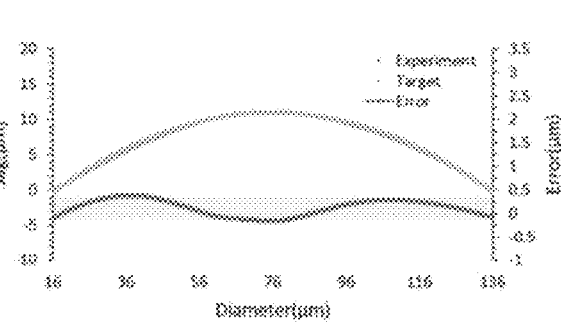
Figure 27F:
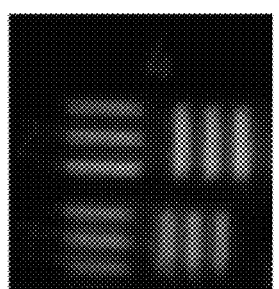

To compare the imaging performance, both lenses were printed. FIGS. 27B and 27D are the SEM images of the plano-convex spherical singlet and aspherical singlet. FIG. 27E compares the surface profiles of the designed and printed aspherical surfaces, the peak-valley surface deviation is less than 1 wave, and RMS surface deviation is less than ¼ wave, demonstrating the proposed 3D printing process is able to print aspherical surfaces precisely. FIGS. 27C and 27F are the images of the elements of the 4$^{th}$ group in the 1951 USAF resolution target, clearly validating that the aspherical surface is effective in reducing the spherical aberration for better image quality. The reason the resolving powers of the lenses in FIGS. 27A-F were lower than that of the lenses in FIGS. 26A-I was that the numerical apertures of the lenses in FIGS. 27A-F were smaller than that of the lenses used in FIGS. 26A-I.

Figure 28A:
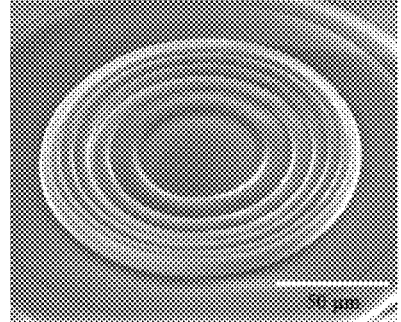
FIGS. 28A-28C show 3D printed optical elements with discontinuous structures.
Figure 28B:
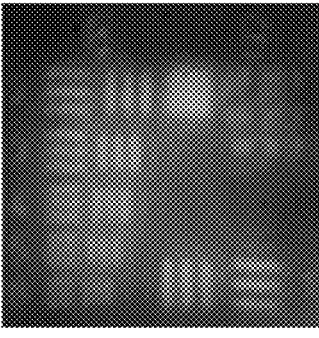
Figure 28C:
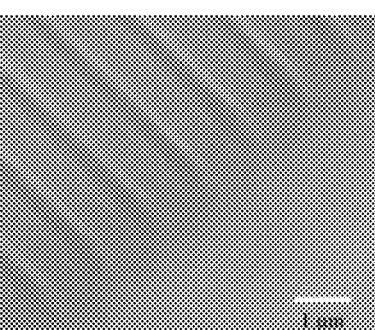

It is well recognized that traditional grinding and polishing methods are incapable of fabricating glass optical elements with structures. However, the proposed 3D printing technology is able to print discontinuous optical components (FIGS. 28A-C), further enriching the feasibility of the glass imaging optics integration. FIG. 28A is the SEM image of a Fresnel surface, and FIG. 28B is the image of the 1951 USAF resolution target formed by this printed Fresnel lens. It was able to resolve the element 6 in group 8; as expected, the contrast was reduced due to the stray light from the Fresnel structures. FIG. 28C is one more example which is the SEM image of a grating with a period of 1.1 μm. This unique capability will significantly reduce the fabrication cost of prototyping discontinuous optical surfaces, potentially enabling more unique applications.

High-Precision Printing of Complex Imaging Systems

Figures 29A, 29B, 29C, 29F, 29G, 29H, 29I:
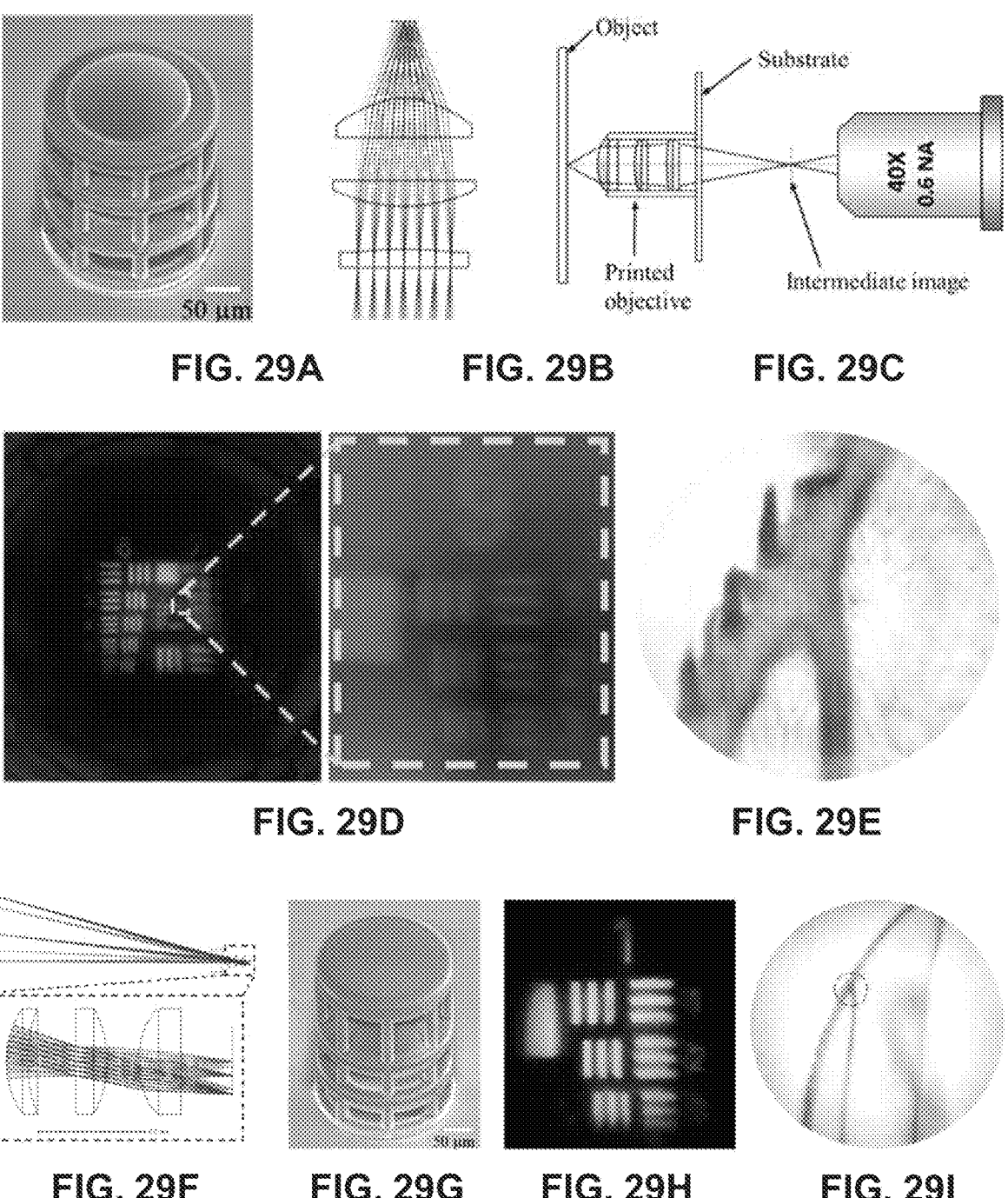

A very time-consuming and error-prone process in building complex optical imaging systems is assembling and aligning optical elements, particularly for micro-optical systems without sufficient freedoms for alignment. One of the key advantages of 3D printing is that all elements can be fabricated together without further alignment, significantly simplifying the process of developing new optical systems. FIG. 29A is the SEM image of a three-element microobjective with the optical layout in FIG. 29B. All three elements were printed as a single objective, the spaces between elements, as well as the tilt and decenter of each element, were controlled precisely by the computer-control motion stage. To test its imaging performance, the image of the USAF 1951 resolution target formed by the microobjective was relayed to the CMOS sensor by a microscope with a 0.5 NA microscope objective (FIG. 29C). As shown in FIG. 29D, the printed micro-objective was able to clearly resolve Element 3 in Group 9, corresponding to the resolution of 780 nm. FIG. 29E shows images of the house fly wing, further demonstrating the imaging performance of the printed glass micro-objective.

In contrast to a high-resolution, small field of view objective, an endoscope objective with a large field of view and lower solution was also fabricated and evaluated. FIGS. 29F and 29G are the optical layout and the SEM image of the printed endoscope objective. FIG. 29H is the image of the elements in the 1$^{st}$ group in 1951 USAF resolution target. FIG. 29I is the image of the same house fly wing, showing the larger field of view and lower resolution than that of the micro-objective in FIG. 29A. The red dot circle in FIG. 29I shows the region imaged by the micro-objective and displayed in FIG. 29E.

Figures 30A, 30B, 30C, 30D:
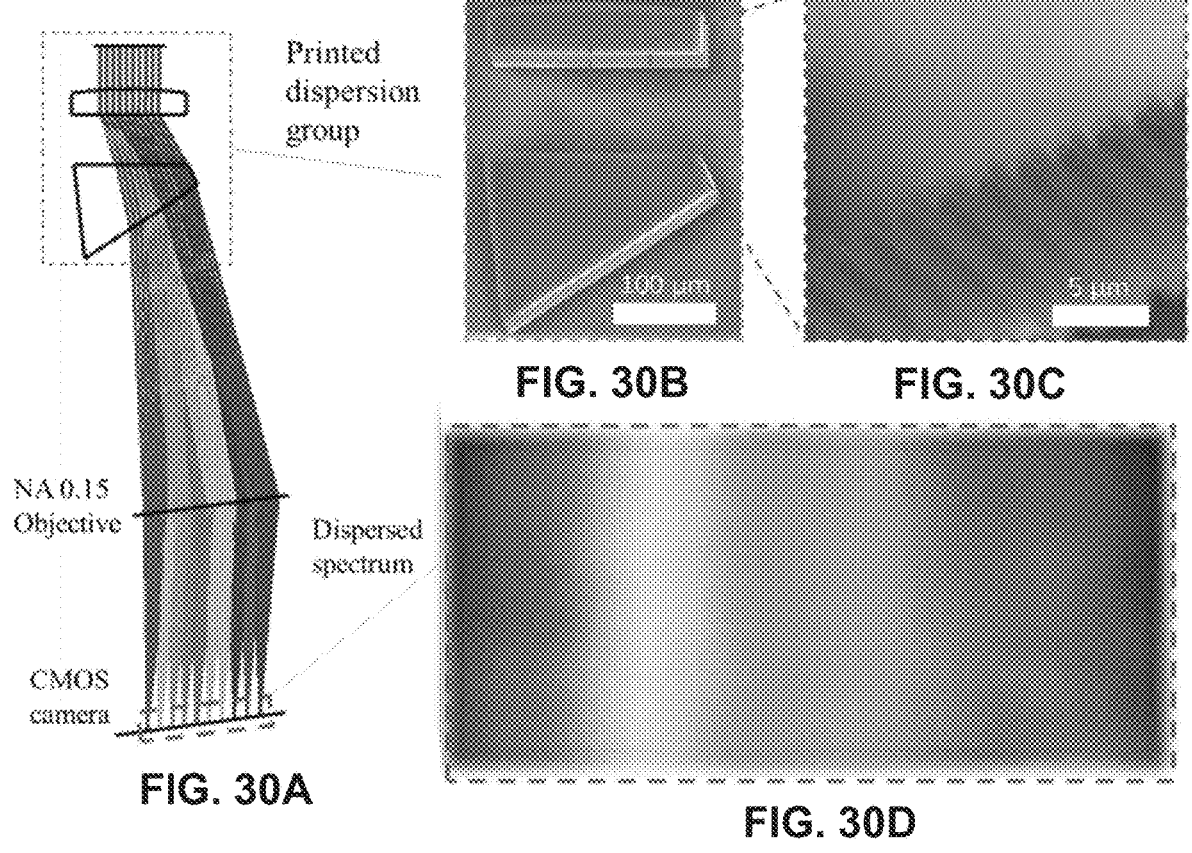
FIGS. 30A-30D illustrate a micro-spectrometer with printed dispersion assembly.

As demonstrated in FIG. 28A-C, the proposed printing technique is able to print optical elements with microstructures. This capability enables unique applications not possible with the traditional fabrication methods. FIGS. 30A-D demonstrate a compact spectral imaging system. FIG. 30A is the layout of the micro-spectrometer with the printed dispersion assembly, which consists of a lens with grating in the flat surface and a dispersion prism. FIG. 30B is the SEM image of the printed dispersion assembly with the lens and prism printed on the same substrate, and FIG. 30C is the SEM image of the lens flat surface with grating. The collimated light from a white LED illuminated the dispersion group and then focused to the CMOs camera by a microscope objective. The dispersed spectrum distribution was clearly recorded in the CMOS camera as shown in FIG. 30D. This example demonstrates that more complex, alignment-free optical systems with different types of optical elements can also be printed.

Figure 31A:
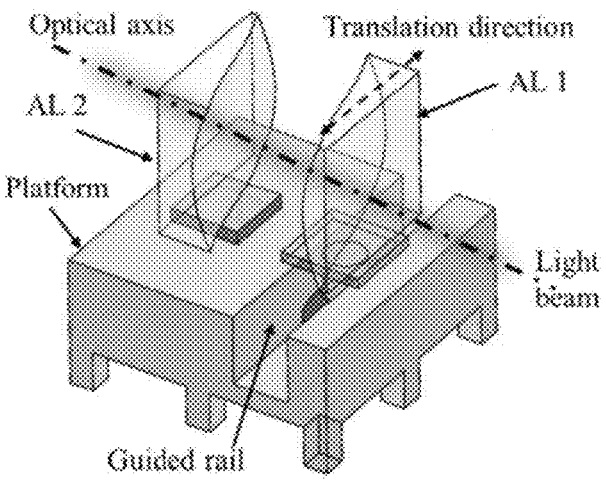
FIGS. 31A-31B illustrate an Alverez lens with a movable element.

To further demonstrate the unique capability of the proposed printing technique in printing freeform surfaces, an Alvarez lens pair was printed with one movable lens. FIG. 31A is the schematic diagram, a platform with a guided rail was printed first, and then the first lens was printed onto the platform directly. The second lens was printed separately and then mounted to the guided rail. The Alvarez lens was defined by the following equations:

$$Z_1(X, Y) = A\left(\frac{1}{3}X^3 + XY^2\right) + C \tag{2a}$$

$$Z_2(X, Y) = -A\left(\frac{1}{3}X^3 + XY^2\right) + C \tag{2b}$$

where A=0.0216 and C=0.036. The distance between two lenses was 110 μm. This Alvarez lens focused the collimated beam to different locations as one of the lenses moved.

Figure 31B:
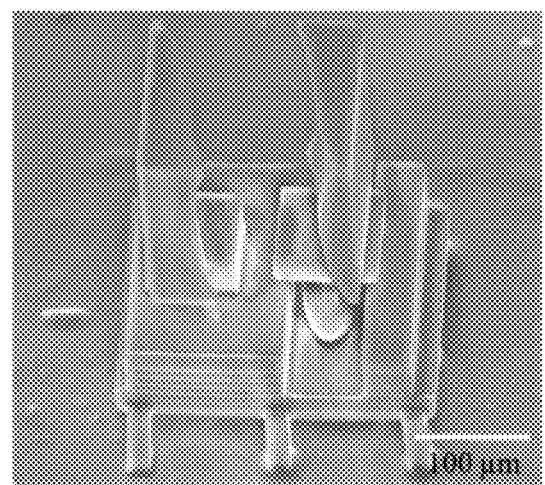
Figure 31C:
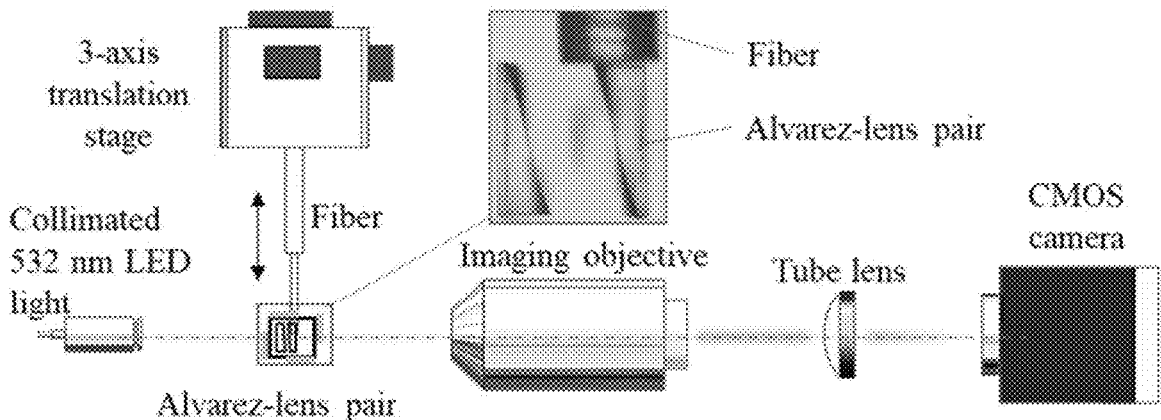
FIGS. 31C-31E illustrate an experiment to demonstrate the performance of the printed Alvarez lens.
Figure 31D:
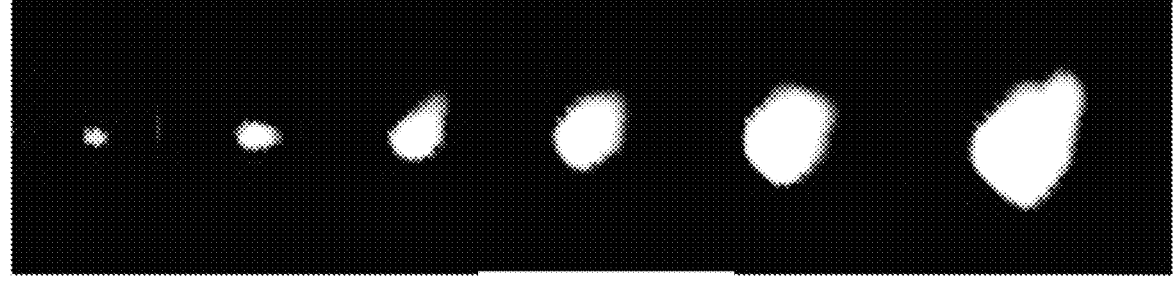
Figure 31E:
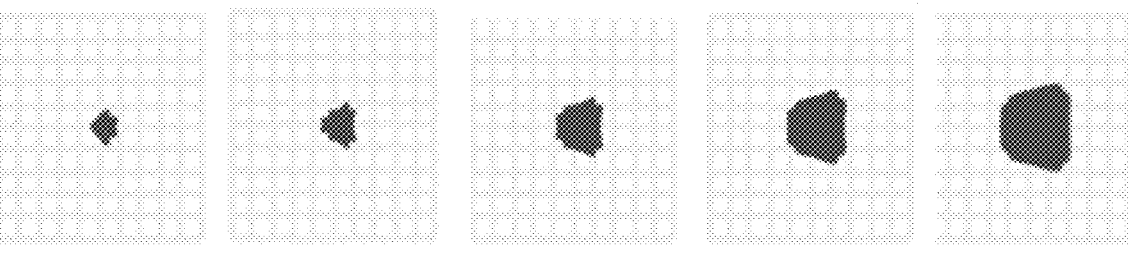

FIG. 31B is the SEM image of the assembled Alvarez lens. A testing system was built to evaluate the function of the printed Alvarez lens as shown in FIG. 31C. A collimated 532 nm LED light illuminated the assembled Alvarez lens. A small fiber was mounted to a 3-axis translation stage to move one of the Alvarez lenses as shown in the inset. A microscope was used to image the plane where the initial focused spot was located to the CMOS camera. During the movement of one Alvarez lens, the microscope was not moved to follow the focal point to show the change in beam size. As shown in FIG. 31D, the spot size on the camera increased as the Alvarez lens was moved. FIG. 31E is the simulated measured spot size (not the focal point) at the image plane. Compared FIGS. 31D and 31E, the through-movement change of the spot size matched well, with some minor differences in shape, mainly due to the beam shape of the input light. Optical systems with movable elements, such as zoom lens, are often designed and fabricated to meet some special needs. For this type of optical systems, the challenge is the moving element. This study has demonstrated the great potentials of the reported 3D printing method and materials in future various applications.

Conclusion

The present example features the development and characterization of an optimized pre-condensed liquid silica resin with higher curing speed, better mechanical properties, lower thermal treatment temperature without sintering, reduced shrinkage, and good optical performance. The example also demonstrates the precision TPP 3D printing process for complex glass optical systems and evaluation of their performance for imaging applications. Compared to the 3D printed polymer optics, the glass optics has much better thermal stability, mechanical properties, chemical resistance, and imaging performance in UV, NIR, and IR regions. Compared to the traditional polishing and molding methods, 3D printing has unique capabilities in fabricating optical elements with freeform and discontinuous shapes, complex multi-element alignment-free optical systems, and optical systems with moving elements. Based on the measured surface quality and shape deviation, as well as the image quality, it is believed that 3D printing of glass imaging optics will play a significant role in precision optical imaging very soon.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A liquid silica resin for three-dimensional printing of low shrinkage glass microstructures, the resin comprising the product of a condensation reaction between:

a. a tetraalkoxysilane monomer; and b. a photocurable silane monomer;

wherein the condensation reaction is a partial condensation reaction, wherein a degree of the partial condensation reaction is determined by use of a substoichiometric amount of water in the condensation reaction.

2. The resin of claim 1, wherein a degree of the partial condensation reaction is such that the resin is liquid at room temperature.

3. The resin of claim 1, wherein the photocurable silane monomer is a trialkoxysilane monomer.

4. The resin of claim 1, wherein the photocurable silane monomer has a photopolymerizable moiety.

5. The resin of claim 4, wherein the photopolymerizable moiety is an acrylic or methacrylic moiety.

6. The resin of claim 1, wherein the photocurable silane monomer is methacryloxymethyltrimethoxysilane, 3-methacryloxypropyltrimethoxysilane, methacryloxypropyltriethoxysilane, methacryloxymethyltriethoxysilane, (3-acryloxypropyl)trimethoxysilane, or acryloxymethyltrimethoxysilane.

7. The resin of claim 1, wherein the tetraalkoxysilane monomer is tetraethoxysilane (TEOS), tetramethoxysilane (TMOS), tetraisopropoxysilane, or tetrabutoxysilane.

\* \* \* \* \*